(12) United States Patent
Choi

(10) Patent No.: US 12,331,993 B2
(45) Date of Patent: Jun. 17, 2025

(54) APPARATUS AND METHOD FOR MANUFACTURING DRY ICE NUGGET USING LIQUID CARBON DIOXIDE AND DRY ICE NUGGET MANUFACTURED BY THE SAME

(71) Applicant: VICTEX CO., LTD., Gimpo-si (KR)

(72) Inventor: Jin Heung Choi, Uijeongbu-si (KR)

(73) Assignee: VICTEX CO., LTD., Gimpo-si (KR)

( * ) Notice: Subject to any disclaimer, the term of this patent is extended or adjusted under 35 U.S.C. 154(b) by 922 days.

(21) Appl. No.: 17/477,901

(22) Filed: Sep. 17, 2021

(65) Prior Publication Data

US 2022/0026144 A1  Jan. 27, 2022

Related U.S. Application Data

(63) Continuation of application No. PCT/KR2021/005966, filed on May 12, 2021.

(30) Foreign Application Priority Data

Jul. 23, 2020 (KR) .................. 10-2020-0091520
Aug. 4, 2020 (KR) .................. 10-2020-0097393
(Continued)

(51) Int. Cl.
*F25J 1/00* (2006.01)
*B30B 9/28* (2006.01)
*C01B 32/55* (2017.01)

(52) U.S. Cl.
CPC .............. *F25J 1/0027* (2013.01); *B30B 9/28* (2013.01); *C01B 32/55* (2017.08); *F25J 2205/20* (2013.01)

(58) Field of Classification Search
CPC ........ B30B 9/28; F25J 1/0027; F25J 2205/20; C01B 32/55; C01B 32/50; F25D 3/12; B01J 2/20; B01J 2/22
See application file for complete search history.

(56) References Cited

U.S. PATENT DOCUMENTS 5,548,960 A  *  8/1996  Anderson .............. C01B 32/55
                                              62/341
2004/0093895 A1 *  5/2004  Schreiber ............. A23B 2/788
                                              62/604
(Continued)

FOREIGN PATENT DOCUMENTS

EP        0029867      * 10/1981
JP        S61-160638 A    7/1986
(Continued)

OTHER PUBLICATIONS

17477901_Aug. 21, 2024_KR_20160039366_ (Year: 2016).*
(Continued)

*Primary Examiner* — Frantz F Jules
*Assistant Examiner* — Martha Tadesse
(74) *Attorney, Agent, or Firm* — Studebaker Brackett PLLC

(57) ABSTRACT

The present invention relates to an apparatus and method for manufacturing a dry ice nugget using liquid carbon dioxide and a dry ice nugget manufactured by the method, wherein the method includes injecting liquid carbon dioxide into a cylinder having a predetermined internal space formed therein, accumulating the liquid carbon dioxide, which is solidified in the internal space, at a lower end of the cylinder, pressurizing the predetermined internal space by lowering a piston located above the cylinder, and compression-molding the liquid carbon dioxide in a solid state pressurized by the piston.

16 Claims, 17 Drawing Sheets

(30) Foreign Application Priority Data

Aug. 4, 2020 (KR) ........................ 10-2020-0097394
Apr. 12, 2021 (KR) ........................ 10-2021-0047404

(56) References Cited

U.S. PATENT DOCUMENTS

| | | | | |
|---|---|---|---|---|
| 2007/0059201 | A1* | 3/2007 | Sundaram | A23B 2/88 422/28 |
| 2007/0074539 | A1* | 4/2007 | Rossewey | C01B 32/55 62/384 |

FOREIGN PATENT DOCUMENTS

| | | | |
|---|---|---|---|
| JP | 2001-180946 | A | 7/2001 |
| JP | 2001-335311 | A | 12/2001 |
| JP | 4559784 | B2 | 10/2010 |
| JP | 5200074 | B2 | 5/2013 |
| JP | 6609422 | B2 | 11/2019 |
| JP | 2023017226 | A * | 2/2023 |
| KR | 20-1997-0041193 | U | 7/1997 |
| KR | 20-0345540 | Y1 | 3/2004 |
| KR | 20-0367949 | Y1 | 11/2004 |
| KR | 10-2015-0036855 | A | 4/2015 |
| KR | 10-2015-0117368 | A | 10/2015 |
| KR | 20160039366 | * | 1/2016 |
| KR | 10-1595500 | B1 | 2/2016 |
| KR | 20160049326 | A * | 3/2016 |
| KR | 10-2016-0049326 | A | 5/2016 |
| KR | 10-2017-0006914 | A | 1/2017 |
| KR | 10-2034388 | B1 | 10/2019 |
| KR | 10-2195970 | B1 | 12/2020 |

OTHER PUBLICATIONS

17477901_Aug. 22, 2024_EP_0029867_ (Year: 1981).*
"Notification of Reason for Refusal" Office Action issued in KR 10-2020-0091520; mailed by the Korean Intellectual Property Office on Sep. 22, 2020.
"Notification of Reason for Refusal" Office Action issued in KR 10-2020-0097394; mailed by the Korean Intellectual Property Office on Oct. 22, 2020.
"Notification of Reason for Refusal" Office Action issued in KR 10-2021-0047404; mailed by the Korean Intellectual Property Office on Jun. 7, 2021.
"Grant of Patent" Office Action issued in KR 10-2020-0091520; mailed by the Korean Intellectual Property Office on Nov. 24, 2020.
"Grant of Patent" Office Action issued in KR 10-2020-0097393; mailed by the Korean Intellectual Property Office on Nov. 24, 2020.
"Grant of Patent" Office Action issued in KR 10-2020-0097394; mailed by the Korean Intellectual Property Office on Jan. 19, 2021.

* cited by examiner

A100

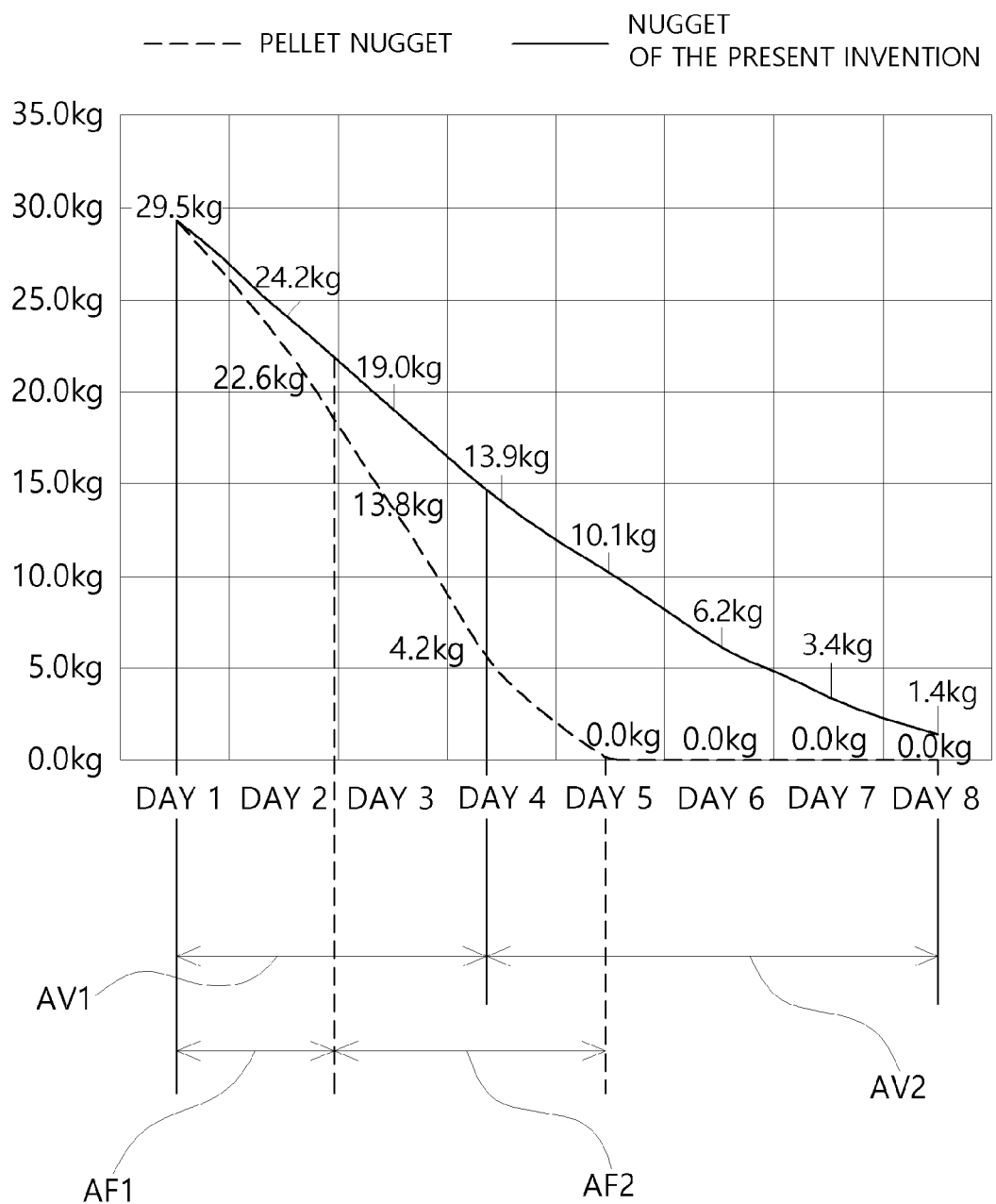

APPARATUS AND METHOD FOR MANUFACTURING DRY ICE NUGGET USING LIQUID CARBON DIOXIDE AND DRY ICE NUGGET MANUFACTURED BY THE SAME

CROSS-REFERENCE TO RELATED APPLICATIONS

This application is a Continuation of International Application No. PCT/KR2021/005966, filed on May 12, 2021, which claims priority to and the benefit of Korean Patent Application No. 10-2020-0091520, filed on Jul. 23, 2020, Korean Patent Application No. 10-2020-0097393, filed on Aug. 4, 2020, Korean Patent Application No. 10-2020-0097394, filed on Aug. 4, 2020, and Korean Patent Application No. 10-2021-0047404, filed on Apr. 12, 2021, the disclosures of which are incorporated herein by reference in its entirety.

BACKGROUND

1. Field of the Invention

The present invention relates to an apparatus and method for manufacturing a dry ice nugget using liquid carbon dioxide, and a dry ice nugget manufactured by the same.

2. Discussion of Related Art

Generally, dry ice refers to the solid form of carbon dioxide and is used as a cooling agent in various fields. Dry ice may sublimate and change into a gas under atmospheric pressure. The sublimation point is about 78.5 degrees below zero. The dry ice is manufactured in the form of nuggets and used as a cooling agent, and mainly, in the case of moving food or medicines, an appropriate amount of dry ice is packed together in a storage box and moved according to a moving distance.

The dry ice is mainly manufactured in the form of pellets at the time of manufacture, and the pellets are secondarily reprocessed and then compression-molded into dry ice. Because the minimum unit of the dry ice manufactured through such a manufacturing process is the size of a pellet, it is difficult to fill the space between a pellet and another pellet with a pellet in the process of recompressing the compressed pellets. This leads to a decrease in the density of the manufactured dry ice, and leads to a relatively short sublimation time relative to the volume of the dry ice.

Thus, recently, it is preferred that a smaller volume of dry ice be used in the distribution process for food delivery or drug delivery efficiency, and to response to this, a dry ice manufacturing method is being studied.

RELATED-ART DOCUMENTS

Patent Documents

Korean Unexamined Patent Publication No. 2015-0117368 (2015 Oct. 20)

SUMMARY OF THE INVENTION

An embodiment of the present invention aims to provide a dry ice nugget manufactured by directly phase-changing liquid carbon dioxide into solid dry ice.

An embodiment of the present invention aims to provide a method of directly phase-changing liquid carbon dioxide into solid dry ice.

The present invention relates to a method of manufacturing a dry ice nugget using liquid carbon dioxide and a dry ice nugget manufactured by the method, and provided is a method of manufacturing a dry ice nugget using liquid carbon dioxide, the method including injecting liquid carbon dioxide into a cylinder in which a predetermined internal space is formed, accumulating the liquid carbon dioxide, which is solidified in the internal space, at a lower end of the cylinder, pressurizing the predetermined internal space by lowering a piston located above the cylinder, and compression-molding the liquid carbon dioxide in a solid state pressurized by the piston.

Also, a particle size of the solidified liquid carbon dioxide may be at least less than 1 mm.

Also, the predetermined internal space at a time point at which the liquid carbon dioxide is injected may be in an atmospheric pressure state.

Provided is a dry ice nugget manufactured by the method of manufacturing a dry ice nugget using liquid carbon dioxide.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 7 is data obtained by testing sublimation rates of a dry ice nugget according to an embodiment of the present invention and a dry ice nugget manufactured via conventional compressed pellets;

FIGS. 8A to 8B are diagrams showing a manufacturing process sequentially performed;

FIGS. 10A and 10B are diagrams showing airtight maintenance structures according to an embodiment of a first aspect of the present invention, wherein FIG. 10A is a diagram showing a groove and a sealing portion, which are a first airtight maintenance structure, and FIG. 10B is a diagram showing a protruding portion which is a second airtight maintenance structure;

FIGS. 11A to 11C are diagrams of a dry ice manufacturing apparatus according to an embodiment of a first aspect of the present invention, wherein FIG. 11A is a diagram showing a state in which a first case is returned, FIG. 11B is a diagram showing that the first case rises to form a compression space, and FIG. 11C is a diagram showing that a pressurization piston is lowered to pressurize liquid carbon dioxide;

FIGS. 14A to 14C are diagrams of a dry ice manufacturing apparatus according to an embodiment of a second aspect of the present invention, wherein FIG. 14A is a diagram showing a case where a first case is at an origin before rising, FIG. 14B is a diagram showing a case where the first case rises to form a pressurization space in a cylinder, and FIG. 14C is a diagram showing a case where a piston is lowered in a pressing direction to pressurize the pressurization space;

FIGS. 15A and 15B show a fixed plate and a variable plate of a piston according to an embodiment of a second aspect of the present invention, wherein FIG. 15A is a diagram showing a state in which the variable plate according to an embodiment of the present invention is reduced, and FIG. 15B is a diagram showing a state in which the variable plate according to an embodiment of the present invention is expanded;

FIGS. 16A and 16B show a cutaway diagram of a fixed plate and a variable plate of a piston according to an embodiment of a second aspect of the present invention, wherein FIG. 16A is a cutaway diagram of a state in which the variable plate according to an embodiment of the present invention is reduced, and FIG. 16B is a cutaway diagram of a state in which the variable plate according to an embodiment of the present invention is expanded;

FIGS. 18A to 18C show a dry ice nugget manufacturing apparatus according to an embodiment of a third aspect of the present invention, wherein FIG. 18A is a diagram showing that a first case and a second case are located at an origin while being spaced apart from each other, FIG. 18B is a diagram showing that a cylinder is formed by contact between the first case and the second case due to the rising of the first case, and FIG. 18C shows that a piston moves in a pressing direction in the cylinder;

DETAILED DESCRIPTION OF EXEMPLARY EMBODIMENTS

Hereinafter, specific embodiments of the present invention will be described with reference to the drawings. However, the specific embodiments are merely exemplary and the present invention is not limited thereto.

In describing the present invention, when it is determined that the detailed description of the known technology related to the present invention may unnecessarily obscure the gist of the present invention, the detailed description thereof will be omitted. In addition, the terms to be described below are terms defined in consideration of functions in the present invention, which may vary according to intentions or customs of users and operators. Therefore, the definition should be made based on the content throughout this specification.

The technical spirit of the present invention is determined by the claims, and the following embodiments are only a means for effectively describing the technical spirit of the present invention to those of ordinary skill in the art to which the present invention belongs.

Figure 1:
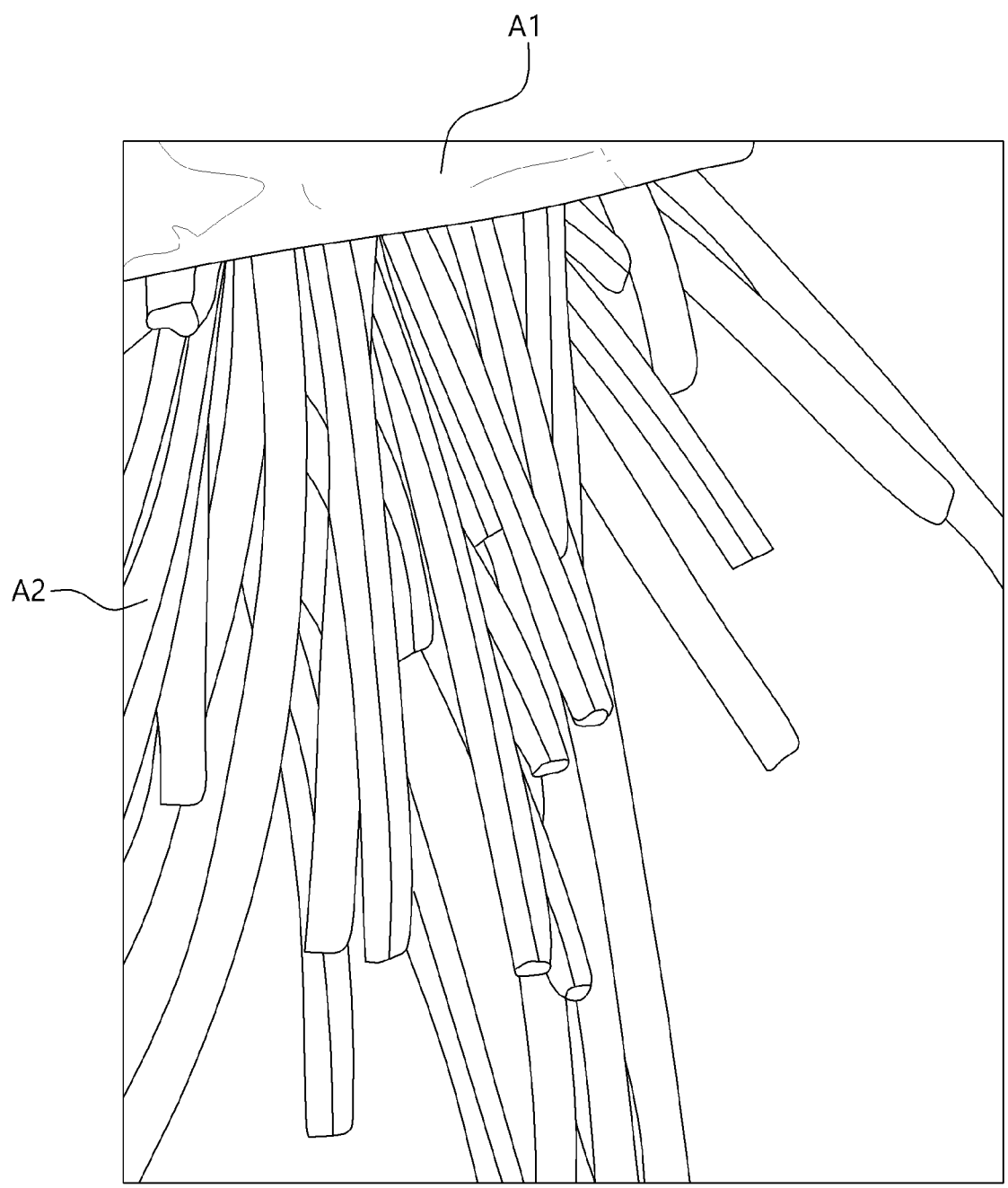
FIG. 1 is a diagram showing that conventional pellets are extruded.
Figure 2:
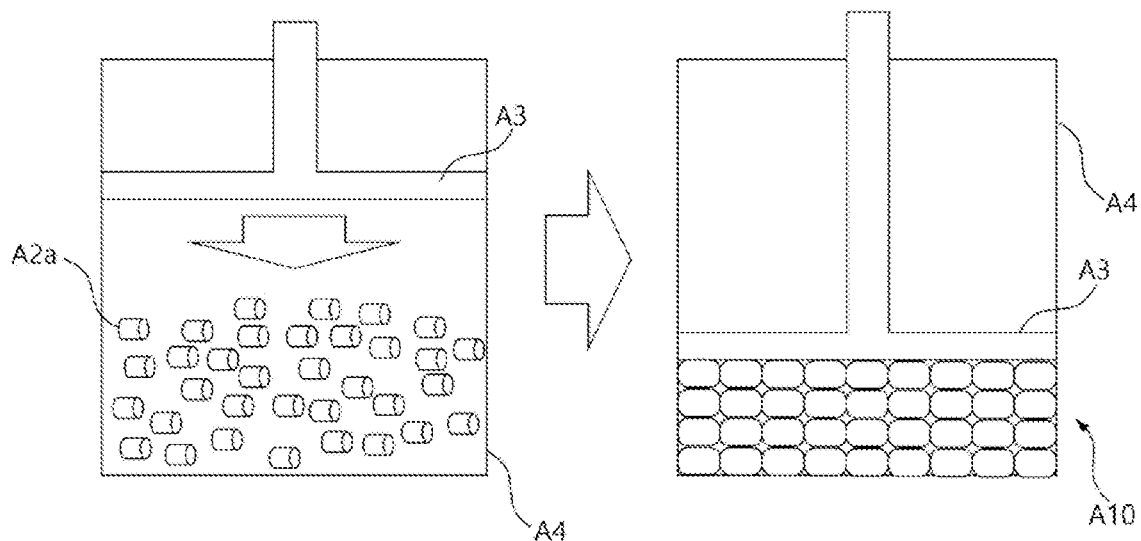
FIG. 2 is a diagram showing that dry ice is manufactured by compressing conventional pellets.
Figure 3:
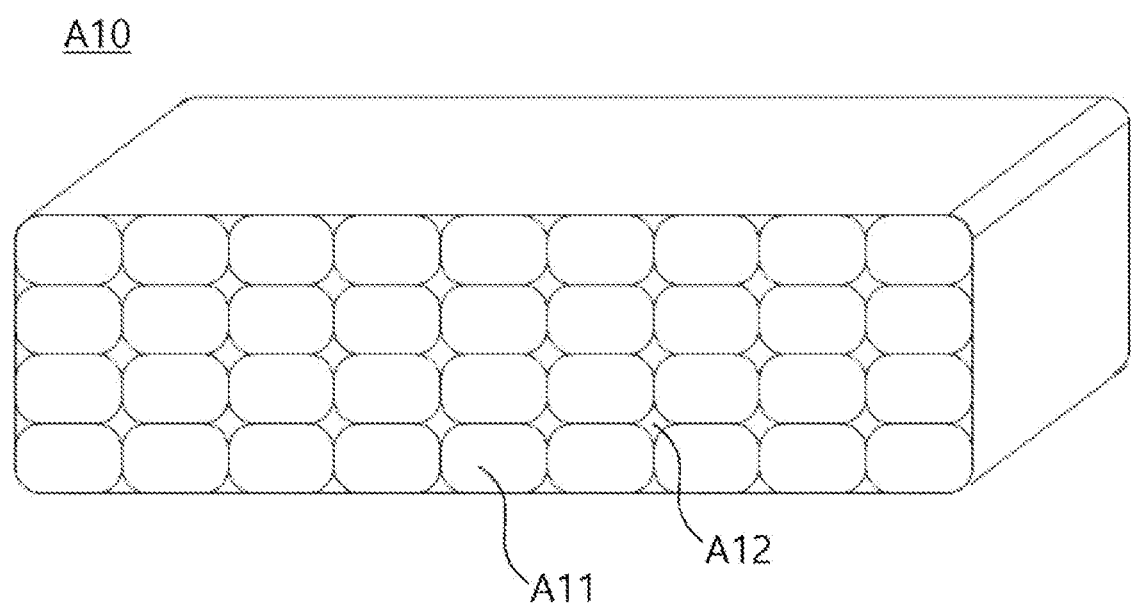
FIG. 3 is a dry ice nugget manufactured by compressing conventional pellets.

FIG. 1 is a diagram showing that conventional pellets A2a are extruded, FIG. 2 is a diagram showing that dry ice is manufactured by compressing the conventional pellets A2a, and FIG. 3 is a dry ice nugget A10 manufactured by compressing the conventional pellets A2a.

Referring to FIGS. 1 to 3, a conventional dry ice manufacturing method is a method of exposing carbon dioxide to an environment such as a predetermined atmospheric pressure and temperature, manufacturing solid carbon dioxide in a pellet form, and then secondarily molding the carbon dioxide to produce dry ice. As shown in FIGS. 1 and 2, when extrusion pellets A2 are manufactured via an extrusion head A1, the extrusion pellets A2 are accommodated in a cylinder A4 and pressurized by a piston A3 to manufacture the dry ice nugget A10 molded by compression between the pellets A2a.

The dry ice nugget A10 manufactured via such a manufacturing process is primarily compression-molded in a process of being extruded, and secondary compression-molding between the pellets A2a is performed. In this case, the finally compression-molded pellets A2a may be already pressurized to a certain level, and thus may be in a state in which density is high. Thus, it is difficult to perform compression-molding via additional pressurization. That is, a higher pressurization force is required for compression molding, and even when compression molding is performed via pressurization, because the smallest particle has a size of the pellets A2a, voids A12 may be formed between the pellets A2a.

Furthermore, considering that the pellets A2a are generally formed to have a size of 3 mm or more based on a diameter thereof, a condition arises whereby only the voids A12 may be formed between the compressed pellets A11. When the pellets A2a are cuboids of the same size and pressurized in an aligned state, the voids A12 may not be generated, but it is effective to extrude pellets A2a having a circular cross-sectional area during an extrusion process, and thus the generation of the voids A12 is inevitable in a compression molding process between the compressed pellets A11.

Figure 4:
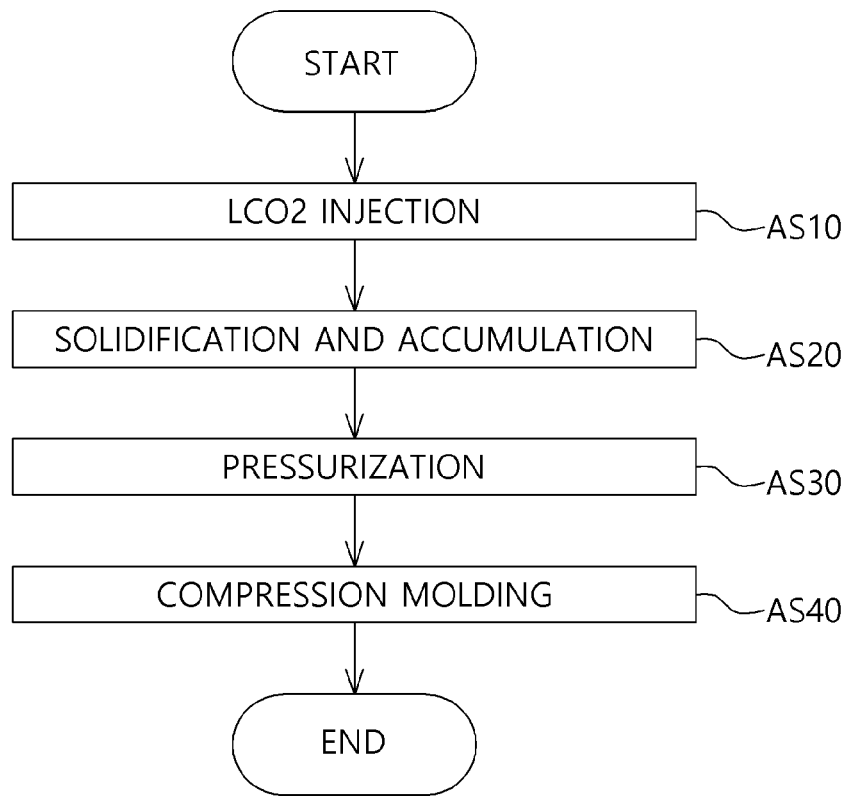
FIG. 4 is a flowchart of a procedure for manufacturing dry ice according to an embodiment of the present invention.
Figure 5:
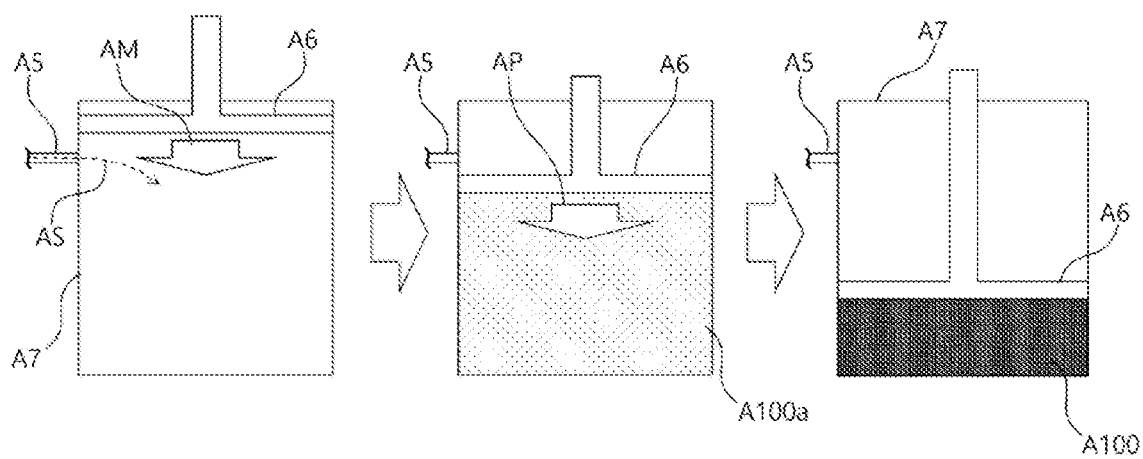
FIG. 5 is a schematic diagram showing the manufacture of dry ice according to an embodiment of the present invention.

FIG. 4 is a flowchart showing a procedure for manufacturing dry ice according to an embodiment of the present invention, and FIG. 5 is a schematic diagram showing the manufacture of dry ice according to an embodiment of the present invention.

Referring to FIG. 4, a method of manufacturing the dry ice nugget A10 using liquid carbon dioxide of the present invention may include a injection operation AS10 in which liquid carbon dioxide is injected into a cylinder A4 in which a predetermined internal space is formed, a solidification operation AS20 in which the liquid carbon dioxide is solidified in the internal space and accumulated at a lower end of the cylinder A4, a pressurization operation AS30 in which a piston A3 located above the cylinder A4 is lowered to pressurize the predetermined internal space, and a molding operation AS40 in which the liquid carbon dioxide in a solid state pressurized by the piston A3 is compression-molded.

In this regard, a particle size of the solidified liquid carbon dioxide may be at least less than 1 mm Preferably, according to a nozzle of a supply portion A5 shown in FIG. 5, the liquid carbon dioxide may have a particle size determined within a micrometer unit. The particle size of the liquid carbon dioxide is not limited thereto and may be determined according to a nozzle structure, and although a smaller particle size is preferable, the particle size thereof may be at least less than 1 mm.

Also, the predetermined internal space at a time point at which the liquid carbon dioxide is injected may be in an atmospheric pressure state. The liquid carbon dioxide injected into the atmospheric pressure state may lower the internal temperature of a cylinder A7. In this case, the solidified liquid carbon dioxide may be compressed by the descent of a piston A6. That is, the dry ice nugget A10 may be formed by exposure to a low temperature high-pressure state.

A dry ice nugget A100 manufactured via this process has a small particle size and is compressed more firmly because initial compression is performed thereon, and intergranular voids A12 solidified to the level of snow A100a may not be generated. That is, density may be high due to a low volume relative to mass. The dry ice nugget A100 (see FIG. 6), which is formed with a high density, of the present invention has no voids A12 and thus has a narrow surface area exposed to the air, such that a sublimation rate may be low. Accordingly, dry ice capable of performing cooling for a longer period of time may be manufactured.

Figure 6:
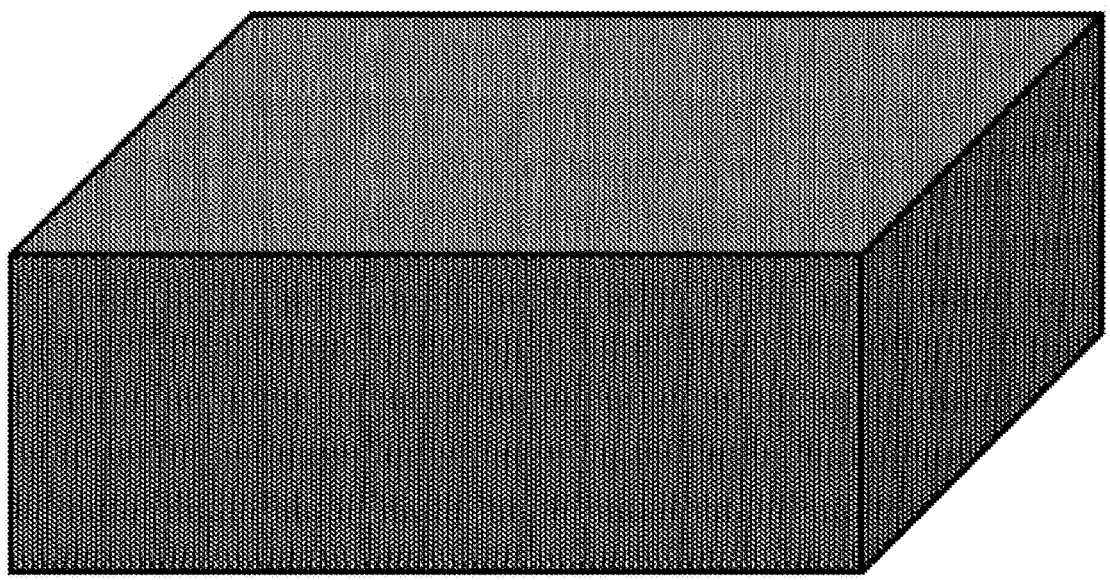
FIG. 6 is a dry ice nugget manufactured via liquid carbon dioxide according to an embodiment of the present invention.
Figure 8A:
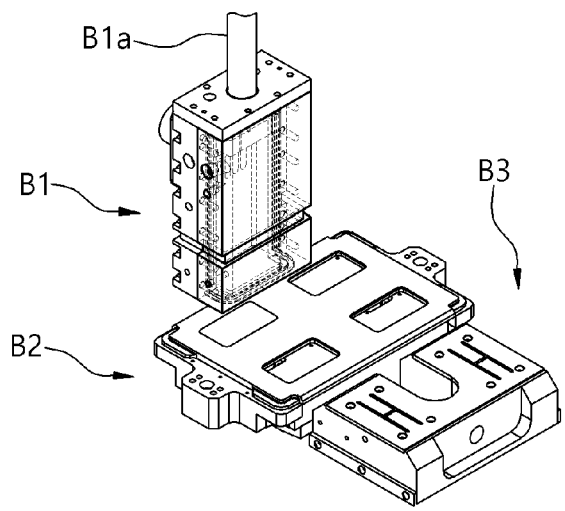
FIGS. 8A to 8D are dry ice manufacturing apparatuses showing the related art.
Figure 8B:
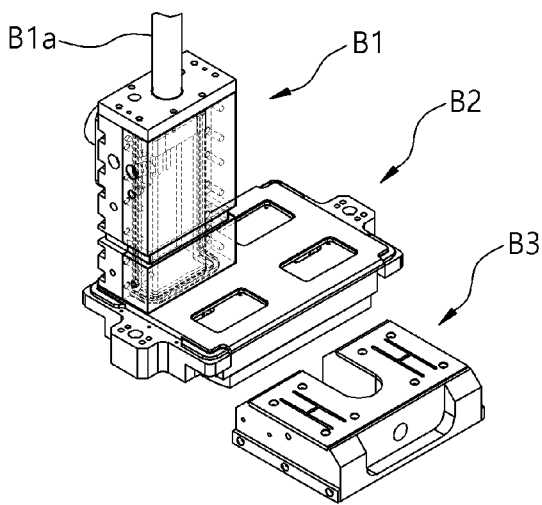
Figure 8C:
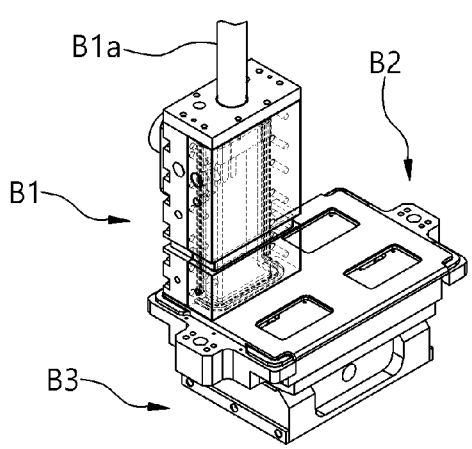
Figure 8D:
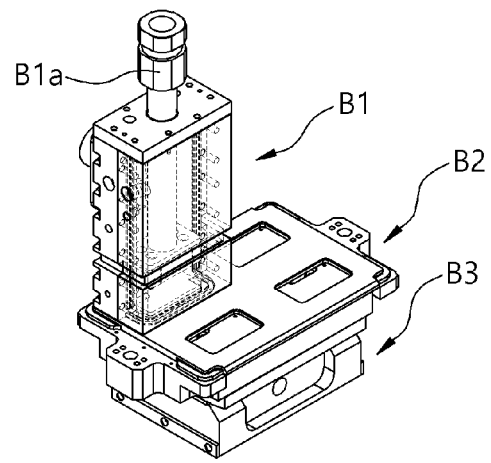

FIG. 7 is data obtained by testing sublimation rates of the dry ice nugget A100 according to an embodiment of the present invention and the dry ice nugget A10 manufactured via the conventional compressed pellets A11, and referring to FIG. 7, sublimation of the dry ice nuggets A10 and A100 may be performed while proceeding from first sublimation sections AV1 and AF1 to second sublimation sections AV2 and AF2. In this regard, a difference between the dry ice nugget A100 of the present invention and the dry ice nugget A10 manufactured by compressing the conventional pellets A2a pertains to a sublimation rate, which is due to the presence/absence of the voids A12. It may be confirmed that, in the sublimation sections of the dry ice nugget A100 of the present invention, a slope of the second sublimation section AV2 becomes gentler than that of the first sublimation section AV1. This is because there are no voids, and when the dry ice nugget A100 is manufactured in a cube shape as shown in FIG. 6, the surface area decreases as the dry ice nugget A100 sublimates, and the sublimation rate may decrease.

In contrast, in the sublimation sections of the dry ice nugget A10 manufactured by compressing the pellets A2a, a slope of the second sublimation section AF2 is greater than that of the first sublimation section AF1, which means that the sublimation rate accelerates. This means that as the dry ice nugget A10 exposed to the atmosphere through the voids A12 sublimates, the exposed surface area increases and the sublimation rate gradually increases, and it may be confirmed that, immediately before complete sublimation, as the volume itself decreases, the exposed surface area decreases and the sublimation rate decreases.

Considering the trend and duration of the sublimation, the method of manufacturing the dry ice nugget A100 using liquid carbon dioxide, which is an embodiment of the present invention, may produce the high-density dry ice nugget A100 capable of performing a more effective cooling function.

FIGS. 8A to 8D are dry ice manufacturing apparatuses B10 showing the related art, and FIGS. 8A to 8D are diagrams showing a manufacturing process sequentially performed.

Referring to FIGS. 8A to 8D, the conventional dry ice manufacturing apparatus B10 may include a cylinder B1 in which a compression space BP is formed, a molding plate B2 located under the cylinder B1 to form dry ice, and a support end B3 supporting the molding plate B2. The dry ice manufacturing apparatus B10 is an apparatus for producing dry ice by lowering a pressurization member B1a in the cylinder B1 after the molding plate B2 moves upward under the cylinder B1 and comes into contact with the cylinder B1. In this regard, because the pressurization member B1a is lowered while increasing pressure in the cylinder B1, the pressure may be increased in all directions in the cylinder B1. An inner wall of the cylinder B1 is located on the side and may be supported with relatively high strength, and because the downward pressing member B1a is located above, the pressure that may be output by the pressurization member B1a may be transmitted. However, only when the molding plate B2 is able to support the outputable pressure or more of the pressurization member B1a without being pushed, is the output able to be entirely transmitted to compression of dry ice.

The molding plate B2 moves upward and comes into contact with the cylinder B1, and thus may move upward and downward. The molding plate B2 may be pushed downward again during pressurization by a load pressurized from the pressurization member B1a as much as the molding plate B2 moves upward. In this regard, because the pushing has an effect of buffering a pressurization force output from the pressurization member B1a in a direction in which the pressure is applied, the desired output may not be transmitted to dry ice, and because density is lower than a desired value, a vaporization rate of the dry ice may be increased more than expected. That is, such apparatus and a process in which the apparatus is driven causes a short lifespan of the manufactured dry ice.

Figure 9:
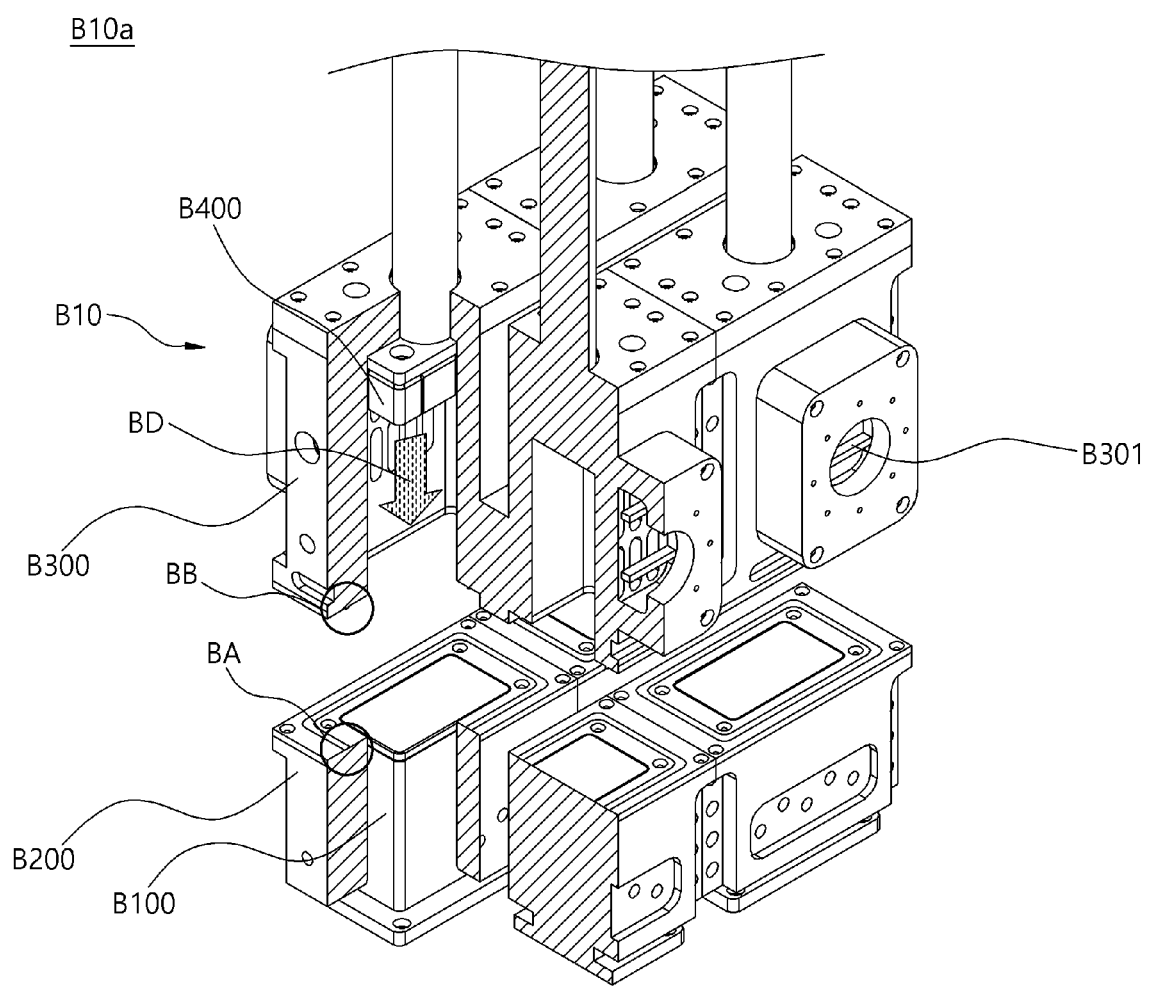
FIG. 9 is a diagram showing that a plurality of dry ice manufacturing apparatuses according to an embodiment of a first aspect of the present invention are connected to each other.

FIG. 9 is a diagram showing that a plurality of dry ice manufacturing apparatuses B10 according to an embodiment of a first aspect of the present invention are connected to each other, and a portion thereof is cut out for convenience of description.

Referring to FIG. 9, the dry ice manufacturing apparatus B10 may be driven by connecting a plurality of apparatuses to each other in order to increase the production of dry ice. It goes without saying that this example discloses such an embodiment and may be driven independently.

A dry ice manufacturing apparatus B10a of an embodiment of the present invention may include a support base B100, a first case B200, a second case B300, and a pressurization piston B400. In detail, the support base B100 may be fixed to a ground surface. The meaning of being fixed to the ground surface means that even when pressure is transmitted from the pressurization piston B400, the support base B100 is not moved by the pressure and may be fixed. For example, when the pressurization piston B400 pressurizes the support base B100 from the upper side to the lower side, it is pushed in a pressing direction BD, which means that a phenomenon such as relieving the pressure does not occur. The pressurization piston B400 may be fixed to the ground surface and extended upward from the ground surface. Dry ice may be formed on an upper surface of the support base B100 extending upward.

Also, the first case B200 may move upward along an extended side surface of the support base B100. In detail, after the first case B200 moves upward, a predetermined process may be performed and the first case B200 may be returned, and when being returned, the first case B200 is not positioned higher than an upper surface of the support base B100. The first case B200 may move upward and come into contact with the second case B300. Due to the contact between the first case B200 and the second case B300, internal spaces of the first case B200 and the second case B300 communicate with each other, and the internal spaces may be spaces to be compressed.

As the first case B200 contacts the second case B300 by moving upward, the compression space BP is formed, and the compression space BP may be pressurized and compressed by the descent of the pressurization piston B400. Prior to the descent of the pressurization piston B400, liquid carbon dioxide may be injected. The liquid carbon dioxide may be injected by a supply hole B301 provided in the second case B300. A supply line which is not shown may be connected to the supply hole B301 to provide liquid carbon dioxide.

In this regard, the pressurization of the pressurization piston B400 may be performed in the pressing direction BD, and an area of a pressurization surface of the pressurization piston B400 may be identical to an area of the upper surface of the support base B100. Also, pressurization in the pressing direction BD may pressurize the support base B100 downward. In this regard, as described above, since the support base B100 is fixed to the ground surface, movement such as pushing may not occur by downward pressurization. Thus, a pressurization force as much as output by the pressurization piston B400 is used to mold dry ice. For this process, it is necessary to create a high-pressure condition and to maintain airtightness even under the high-pressure condition. Thus, an airtight maintenance structure may be provided at a portion where the first case B200 and the second case B300 are in contact with each other. The airtight maintenance structure includes a first airtight maintenance structure provided on the side of the first case B200 and a second airtight maintenance structure provided on the side of the second case B300, and an airtight state may be maintained more effectively by the contact between them. This will be specifically described with reference to FIGS. 10A and 10B below.

Figure 10A:
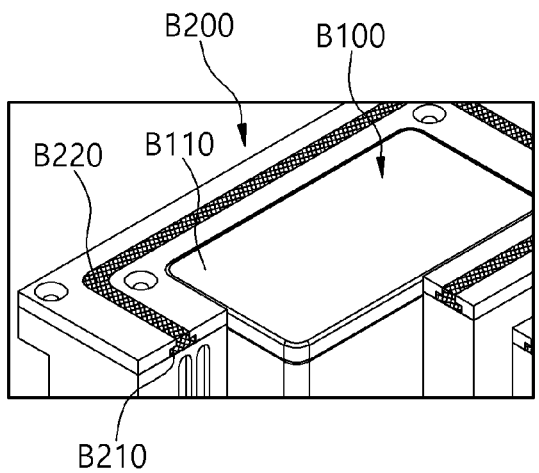
Figure 10B:
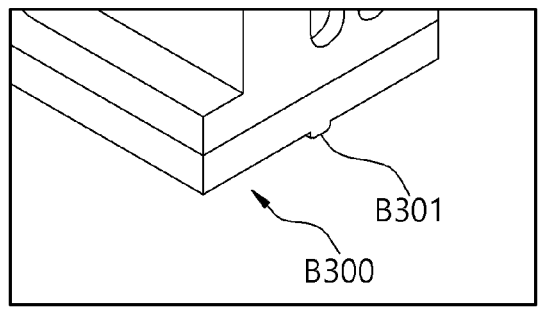

FIGS. 10A and 10B are diagrams showing airtight maintenance structures according to a first aspect of the present invention, FIG. 10A is a diagram showing a groove B210 and a sealing portion B220, which are the first airtight maintenance structure, and FIG. 10B is a diagram showing a protruding portion B320 which is the second airtight maintenance structure.

Referring to FIG. 10A, the upper surface of the support base B100 may be a molding portion B110. The molding portion B110 is a place where dry ice is manufactured and seated, and may be an uppermost end portion of the support base B100 fixed to the ground surface. The first case B200 moves upward along an extension direction of the support base B100 and contacts the second case B300. In this case, the first airtight maintenance structure on the side of the first case B200 in contact may be the sealing portion B220.

The sealing portion B220 may be disposed while being inserted into the groove B210 formed in the first case B200. The groove B210 is formed in the form of "⊥", and may prevent separation of the sealing portion B220. The sealing portion B220 is easily exposed to low temperature and repeatedly subjected to pressurization, and thus may be formed of a material suitable for low temperatures and pressurization. For example, the material may be polytetrafluoroethylene (BPTFE).

Meanwhile, the second airtight maintenance structure corresponding to the sealing portion B220 may be the protruding portion B301 formed in the first case B200. The protruding portion B320 may be formed on one surface of the second case B300 facing the first case B200 and may be formed to correspond to the sealing portion B220.

Here, the maintenance of airtightness according to the maintenance of a contact state between the sealing portion B220 and the protruding portion B320 may be possible when a lowering position of the pressurization piston B400 is located above a position where the first case B200 and the second case B300 are in contact with each other. That is, in a process of pressurizing the pressurization piston B400, as the lowering position of the pressurization piston B400 is lower such that pressure increases, design may be carried out by considering the limit of pressure conditions by which airtightness may be maintained. For example, design may be carried out by adjusting a raising height BH of the first case B200 according to capability of maintaining airtightness.

Figure 11A:
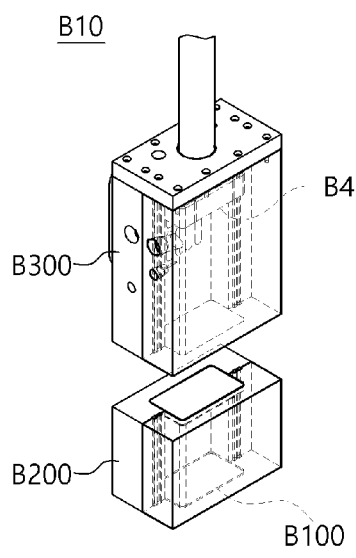
Figure 11B:
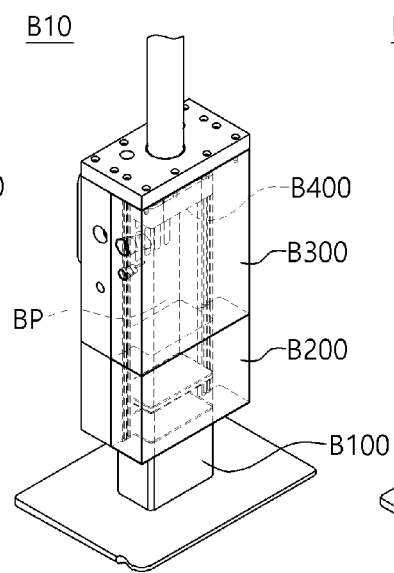
Figure 11C:
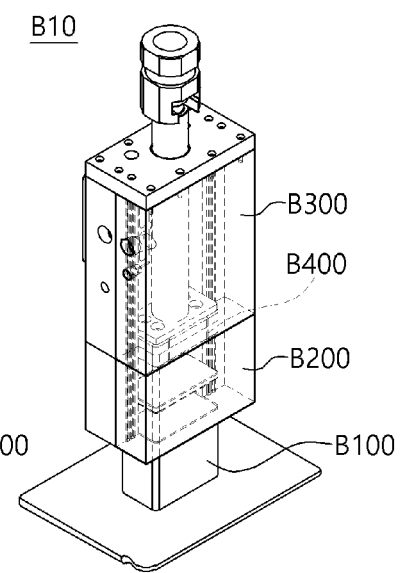

FIGS. 11A to 11C are diagrams showing the dry ice manufacturing apparatus B10 according to an embodiment of a first aspect of the present invention, wherein FIG. 11A is a diagram showing that the first case B200 is returned, FIG. 11B is a diagram showing that the first case B200 rises to form the compression space BP, and FIG. 11C is a diagram showing that the pressurization piston B400 is lowered to pressurize liquid carbon dioxide.

FIG. 11A may be a returned state in which contact surfaces of the first case B200 and the second case B300 are disposed to face each other. At the same time, a pressurization surface of the pressurization piston B400 and an upper surface of the support base B100 may be disposed to face each other. Since this structure is formed by movement in the vertical direction, a moving axis may be driven on one axis. That is, because there is no movement in the horizontal direction and pressure is applied from above on the support base B100 fixed to the ground surface, a configuration and process of the apparatus are simpler than those of the related art shown in FIG. 1 and efficient in manufacturing dry ice.

Referring to FIGS. 11A and 11B, injected liquid carbon dioxide may be pressurized by forming an internal airtight space (the compression space BP in FIG. 11B) communicating with the second case B300 by raising the first case B200. In a state in which the airtight space is formed, the molding portion B110 which is the upper surface of the support base B100 may be positioned lower than the sealing portion B220. In this structure, as the pressurization piston B400 is lowered, a higher pressure is gradually formed, airtightness may be maintained by depending on an output of the lowering pressurization piston B400 rather than depending on the sealing at a maximum high pressure (for example, in a pressure range of 16 bar to 20 bar). This may be described in detail with reference to FIG. 5.

Figure 12:
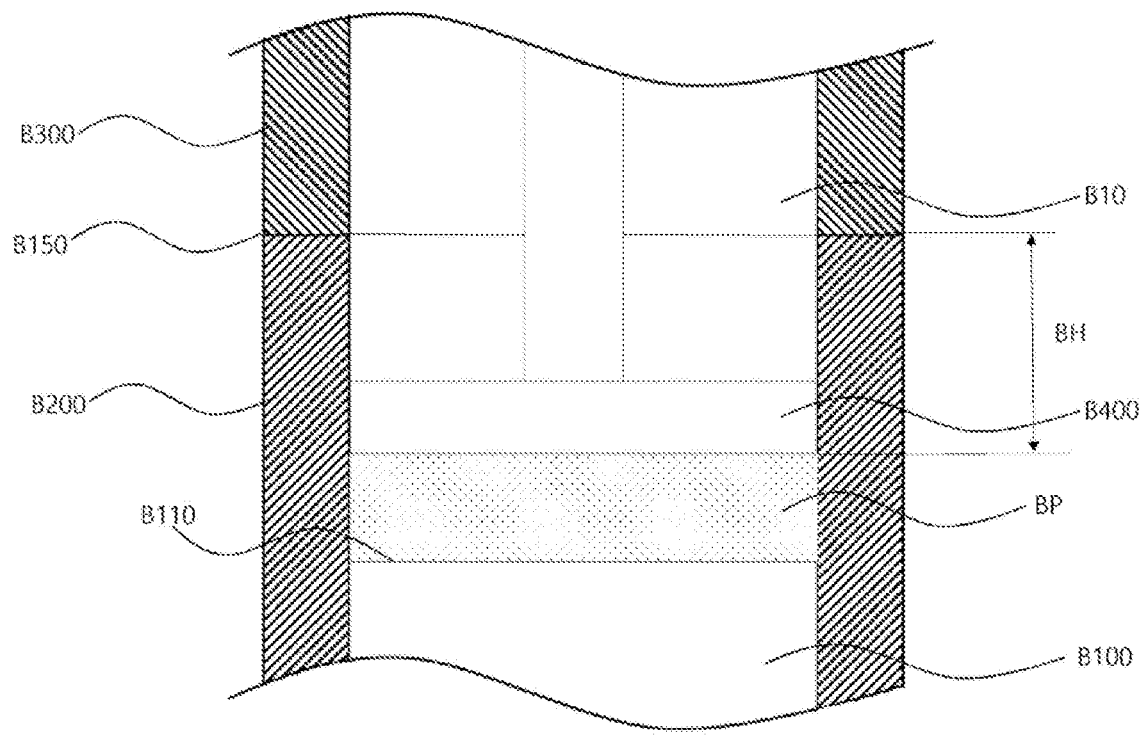
FIG. 12 is a diagram showing the inside of a first case and a second case during pressurization according to an embodiment of a first aspect of the present invention.

FIG. 12 is a diagram showing the inside of the first case B200 and the second case B300 during pressurization according to an embodiment of a first aspect of the present invention.

Referring to FIG. 12, an airtight space may be formed in a space where the first case B200 and the second case B300 communicate with each other while being in contact with each other by the rising of the first case B200, and liquid carbon dioxide may be injected into the airtight space through the second case B300. The airtight space may be changed to be in a high-pressure state as the pressurization piston B400 is lowered. Solid dry ice may be formed in the compression space BP in a predetermined high-pressure state. In this case, accommodation of high pressure in an airtight state may depend on a structure inside the first case B200 rather than depending on the sealing portion B220. That is, the pressurization piston B400 that has reached a position where an environment with high pressure is created may be in a state of being moved toward the first case B200. Here, the high pressure refers to a pressure corresponding to 80% or more of a predetermined maximum pressure, and may indicate a state where the pressurization piston B400 has moved toward the first case B200.

In this structure, a surface exposed in the compression space BP under a high-pressure state may be the first case B200, the pressurization piston B400, and the upper surface (the molding portion B110) of the support base B100. That is, a contact portion B150 where the first case B200 and the second case B300 are in contact with each other may be located at the raising height BH predetermined by a height at which the first case B200 is raised, and 80% or more of a maximum pressure may be formed while a pressurization plate is positioned below the contact portion B150. Through this, liquid carbon dioxide is solidified in the compression space BP and may become dry ice.

Figure 13:
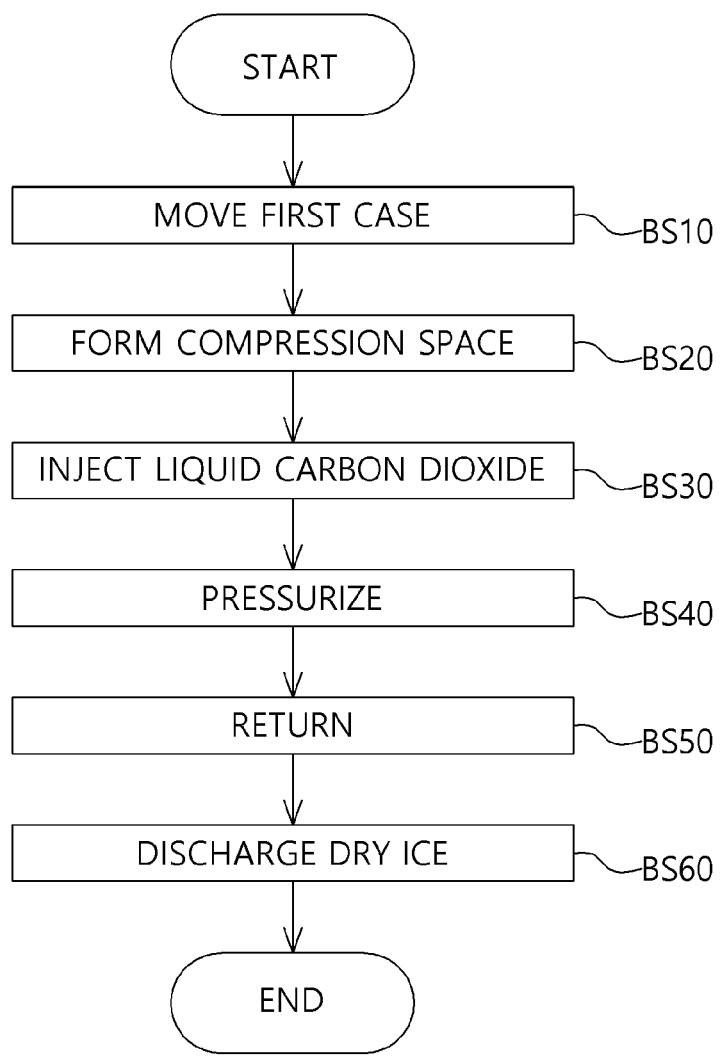
FIG. 13 is a flowchart showing a method of manufacturing dry ice according to an embodiment of a first aspect of the present invention.

FIG. 13 is a flowchart showing a method of manufacturing dry ice according to an embodiment of a first aspect of the present invention. Referring to FIG. 13, the method of manufacturing dry ice may include a first case moving operation BS10, a compression space formation operation BS20, a liquid-carbon dioxide injection operation BS30, a liquid-carbon dioxide pressurization operation BS40, a return operation BS50, and a dry ice discharge operation BS60.

Specifically, in the first case moving operation BS10, the first case B200 rises in the vertical direction. The rising of the first case B200 in the vertical direction is the rising of the first case B200 in the extension direction of the support base B100. Due to the movement of the first case B200, the first case B200 may contact the second case B300 positioned above the first case B200. The first case B200 being in contact with the second case B300 may form an airtight space in a communicating interior. The airtight space is a space subjected to compression.

When the first case B200 rises, an operation of forming the compression space BP is performed, and when the compression space BP is formed, a liquid-carbon dioxide injection operation in which liquid carbon dioxide is injected into the compression space BP through the second case B300 may be performed. When the liquid carbon dioxide is injected, the liquid-carbon dioxide pressurization operation BS40 is performed by the descent of the pressurization piston B400. The pressurized liquid carbon dioxide may be manufactured into solid dry ice. When the dry ice is molded by pressurization, the pressurization piston B400 and the first case B200 may be returned to a state prior to the movement. After the return operation BS50 is completed, a dry ice discharge operation is performed, and thus, dry ice may be collected.

Figure 14A:
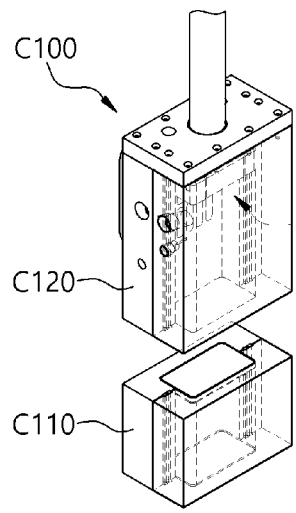
Figure 14B:
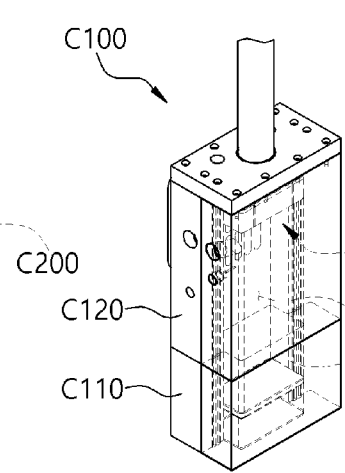
Figure 14C:
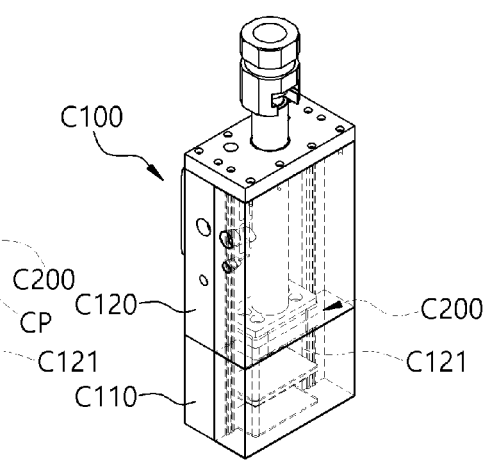

FIGS. 14A to 14C are diagrams of a dry ice manufacturing apparatus according to an embodiment of a second aspect of the present invention, wherein FIG. 14A is a diagram illustrating a case where a first case C110 is at an origin before rising, FIG. 14B is a diagram illustrating a case where the first case C110 rises to form a pressurization space CP in a cylinder C100, and FIG. 14C is a diagram illustrating a case where a piston C200 is lowered in a pressing direction to pressurize the pressurization space CP.

Referring to FIGS. 14A to 14C, the dry ice manufacturing apparatus according to an embodiment of the present invention includes the cylinder C100 and the piston C200. In detail, the cylinder C100 includes the first case C110 and a second case C120. The first case C110 and the second case C120 may be apart from each other while being positioned at the origin. The first case C110 and the second case C120 may come into contact with each other by moving at least one of the first case C110 and the second case C120, and an internal space of the cylinder C100 may be formed in a state in which the first case C110 and the second case C120 contact each other. The internal space may be the pressurization space CP. The pressurization space CP may be pressurized by the movement of the piston C200 positioned on the side of the second case C120, and the pressure of the pressurization space CP may be increased. That is, when the pressurization space CP is formed inside the cylinder C100, as the piston C200 moves to the pressurization space CP, the volume in the pressurization space CP decreases, and the reduced volume of the pressurization space CP relatively increases the pressure of the pressurization space CP.

Here, the increased pressure may be determined in a range of 16 bar to 20 bar. Dry ice may be formed within the above pressure range. Of course, the formation of dry ice may be performed by pressurizing, by the piston C200, the pressurization space CP in a state in which liquid carbon dioxide is injected. The injection of the liquid carbon dioxide may be performed through a supply hole formed in one side of the second case C120. The supply hole may be formed in a surface facing the pressurization space CP in a state before the piston C200 pressurizes the pressurization space CP. While the piston C200 pressurizes toward the side of a pressurization space side, the supply hole is not exposed at the pressurization space side, thereby maintaining the airtightness thereof.

In addition, in the dry ice manufacturing apparatus according to an embodiment of the second aspect of the present invention, a time point when a structurally predetermined pressure is exceeded to provide a relatively high pressure to liquid carbon dioxide through such a mechanism is a state in which at least portion of the piston C200 (a variable plate C220 to be described below) is positioned inside the first case C110. In addition, as the movement of the piston C200 proceeds in the pressing direction inside the first case C110, a passage cross-sectional area becomes narrower.

The above-described structure will be described with reference to FIGS. 15 to 17, first, as the passage cross-sectional area of the piston C200 becomes narrower, a portion of the piston C200 may correspond to a variable structure, which will be described in detail below.

Figure 15A:
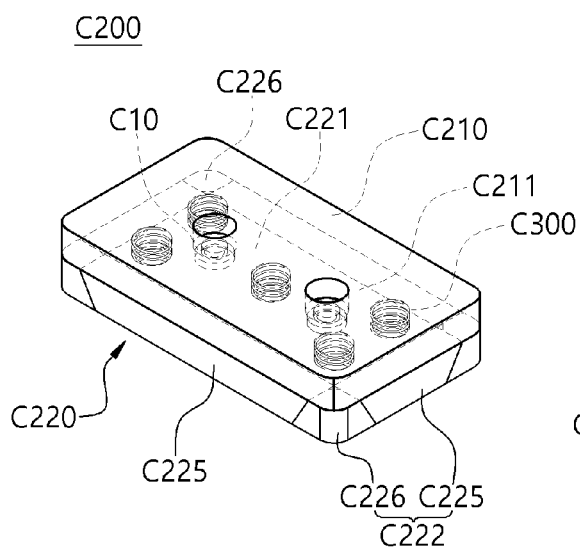
Figure 15B:
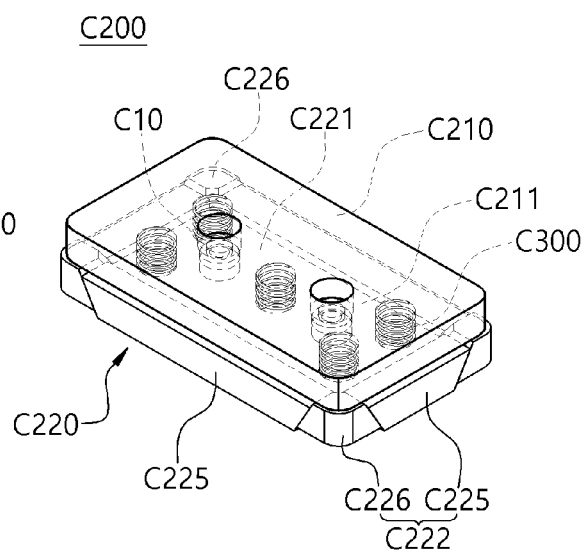

FIGS. 15A and 15B illustrate a fixed plate C210 and a variable plate C220 of the piston C200 according to an embodiment of the second aspect of the present invention, wherein FIG. 15A is a diagram illustrating a state in which the variable plate C220 according to an embodiment of the present invention is reduced, and FIG. 15B is a diagram illustrating a state in which the variable plate C220 according to an embodiment of the present invention is expanded.

Referring to FIGS. 15A and 15B, the piston C200 includes the fixed plate C210, the variable plate C220, and an elastic body C300. A rod that transmits a pressing force in a pressing direction through the fixed plate C210 is connected to the fixed plate C210, but a structure corresponding to the rod is not shown because it is an obvious structure. Hereinafter, the fixed plate C210 and the variable plate C220 will be described below, and this will be referred to as the piston C200.

The piston C200 is based on a state positioned in the dry ice manufacturing apparatus, and when the manufacturing apparatus is in an origin state before being driven, the variable plate C220 may be shown to be in an expanded state. While the piston C200 is pressurized and passes through the inside of the first case C110, the variable plate C220 may be reduced. Here, the expansion and reduction of the variable plate C220 may be expansion and reduction in a lateral direction based on a pressing direction. That is, it means expansion and reduction of a pressing area during the pressing process.

Meanwhile, the fixed plate C210 supports and pressurizes the variable plate C220 in the pressing direction. The variable plate C220 may be positioned in the pressing direction after the fixed plate C210 and may be arranged to face a pressurized support surface C211 of the fixed plate C210. According to a pressing state, the variable plate C220 may be partially spaced apart from the fixed plate C210 and partially contact the fixed plate C210.

In detail, the variable plate C220 includes a vertically variable portion C221 and a laterally variable portion C222. The vertically variable portion C221 may be disposed with the elastic body C300 between the fixed plate C210 and the vertically variable portion C221. Here, the elastic body C300 may have one end connected to the pressurized support surface C211 and the other end connected to the vertically variable portion C221. The elastic body C300 may be elastically deformed at least in the pressing direction, that is, a direction connecting the one end and the other end thereof. In this case, an elastic force generated from the elastic body C300 is transmitted to the pressurized support surface C211 and the vertically variable portion C221. A fixed support portion is fixed on the rod (not shown) and the relative movement thereof is restricted, so that an action by the elastic force is expressed by the vertically variable portion C221.

The elastic body C300 may be positioned while being inserted into the fixed plate C210 to a predetermined depth. Accordingly, when a force exceeding the elastic force of the elastic body C300 is generated in the opposite direction to the pressing direction, the elastic body C300 is contracted into the fixed plate C210, and the vertically variable portion C221 may be in contact with the pressurized support surface C211. That is, the vertically variable portion C221 may be in contact with or spaced apart from the pressurized support surface C211 by a force applied in a direction from the one end to the other end or from the other end to the one end of the elastic body C300.

Meanwhile, the laterally variable portion C222 of the variable plate C220 includes a first interlocking portion C225 and a second interlocking portion C226. The first interlocking portion C225 may be positioned on the side of a surface facing the lateral side of the vertically variable portion C221 and may be in a state of maintaining surface contact with the vertically variable portion C221, and the second interlocking portion C226 maintains surface contact with at least the first interlocking portion C225 and may be moved to the other lateral side by interlocking with the movement of the first interlocking portion C225. Here, the interlocking may be interlocking by an inclined surface contact between each of components when the second interlocking portion C226 is moved by applying an external force in the pressing direction or in an opposite direction of the pressing direction. That is, when a force is applied in the pressing direction and in the opposite direction of the pressing direction, movement occurs not only in the pressing direction but also laterally based on the pressing direction. Here, the pressing area is expanded and reduced by the lateral movement.

Furthermore, the first interlocking portion C225, the second interlocking portion C226, and the vertically variable portion C221 may be in contact with each other by surface contact. The contact relationship made by the surface contact is to maintain the airtightness to the pressurization space CP. This is not limited to the illustrated example of the piston C200, and the contact between the second interlocking portion C226 and the vertically variable portion C221 may be possible through surface contact including a flat surface or a curved surface, in the case of a flat surface, widths of the contact surface are formed to be the same according to the pressing direction, and in the case of the curved surface, the radius or curvature may be kept the same according to the pressing direction.

In addition, the fixed plate C210 may be disposed with the variable plate C220 with elastic body C300 therebetween, and may be fixed by the elastic body C300 in the process, but may be connected through a connection pin C10. The connection pin C10 has one end fixedly connected to the fixed plate C210 side and the other end connected in a fluid state on the variable plate C220 side with a clearance space C11 formed. In this regard, it will be described below with reference to FIGS. 16A and 16B below.

Figure 16A:
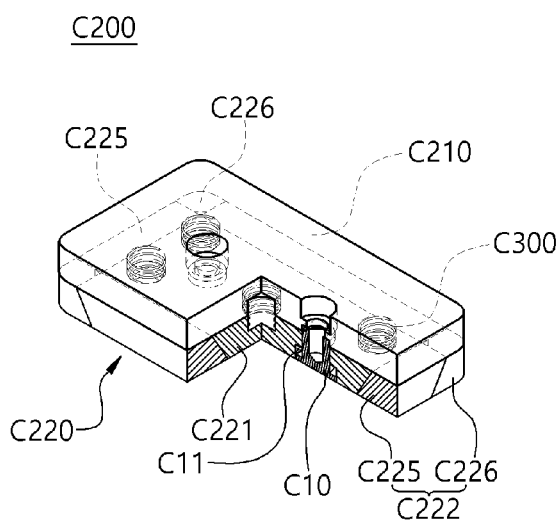
Figure 16B:
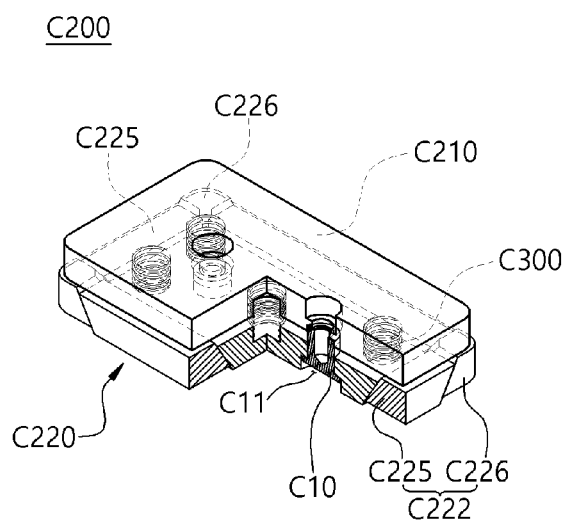

FIGS. 16A and 16B illustrate a cutaway diagram of the fixed plate C210 and the variable plate C220 of the piston C200 according to an embodiment of the second aspect of the present invention, wherein FIG. 16A is a cutaway diagram illustrating a state where the variable plate C220 according to an embodiment of the present invention is reduced, and FIG. 16B is a cutaway diagram illustrating a state where the variable plate C220 according to an embodiment of the present invention is expanded.

Referring to FIGS. 16A and 16B, the connection pin C10 allows the variable plate C220 to be connected after the fixed plate C210 to pull the vertically variable portion C221 while the piston C200 is reciprocating inside the cylinder C100. However, because the variable plate C220 moves vertically and laterally for each part, a clearance space C11 for accommodating a moving distance may be required. Here, the clearance space C11 may be formed on a side to which the connection pin C10 is connected. As shown, when one end of the connection pin C10 is connected to the fixed plate C210 and the other end is connected to the vertically variable portion C221, the other end may be expanded more than a section in which the connection pin C10 extends from the one end to the other end. According to this shape, the vertically variable portion C221 may be pulled. In addition, the expanded space may be provided with the clearance space C11 as much as a section that varies when the vertically variable portion C221 is varied in the pressing direction or the opposite direction of the pressing direction, so that the connection pin C10 is moved when variable in the clearance space C11 and may accommodate variable trajectories.

Although the aforementioned piston C200 is shown as having a round rectangular shape, when three or more parts corresponding to the first interlocking portion C225 are provided, a modified implementation may be possible. Here, the part corresponding to the first interlocking portion C225 requires a linear configuration because the linkage mechanism is due to the change of the movement direction according to the inclined surface. Accordingly, as a modified example, a modified embodiment such as a round triangle, a triangle, a round pentagon, and a pentagon is possible.

In addition, it is preferable that an angle of the inclined surface is made within a 45 degree angular spacing range based on the pressing direction. When the angular spacing range exceeds 45 degrees, relatively large energy is required for lateral motion to be transmitted, which becomes resistance, so that the pressing force transmitted to the dry ice is lost. Accordingly, it is determined within the range of 45-degree angular spacing, it may be determined to correspond to an expansion and reduction range of the variable plate, which also affects the length of the inclined plane, that is, the thickness of the variable plate C220. As a combination of the above conditions, it is preferable that the pressing force transmitted to the dry ice is determined so that the loss of the pressing force may be minimized by the change of the variable plate C220.

In addition, the second interlocking portion C226 may maintain contact with the pressurized support surface C211. The maintenance of contact may be maintained by a magnetic force or a long hole and a guide pin guided to the long hole may be applied. When a long hole and a guide pin are used, a non-penetrating long hole is formed on one surface of the second interlocking portion C226 facing the pressurized support surface C211 in the direction in which the second interlocking portion C226 expands, or a guide pin that is formed to protrude from the pressurized support surface C211 or inserted into the long hole by coupling of a separate member to be guided in the direction in which the long hole is formed may be provided.

Figure 17:
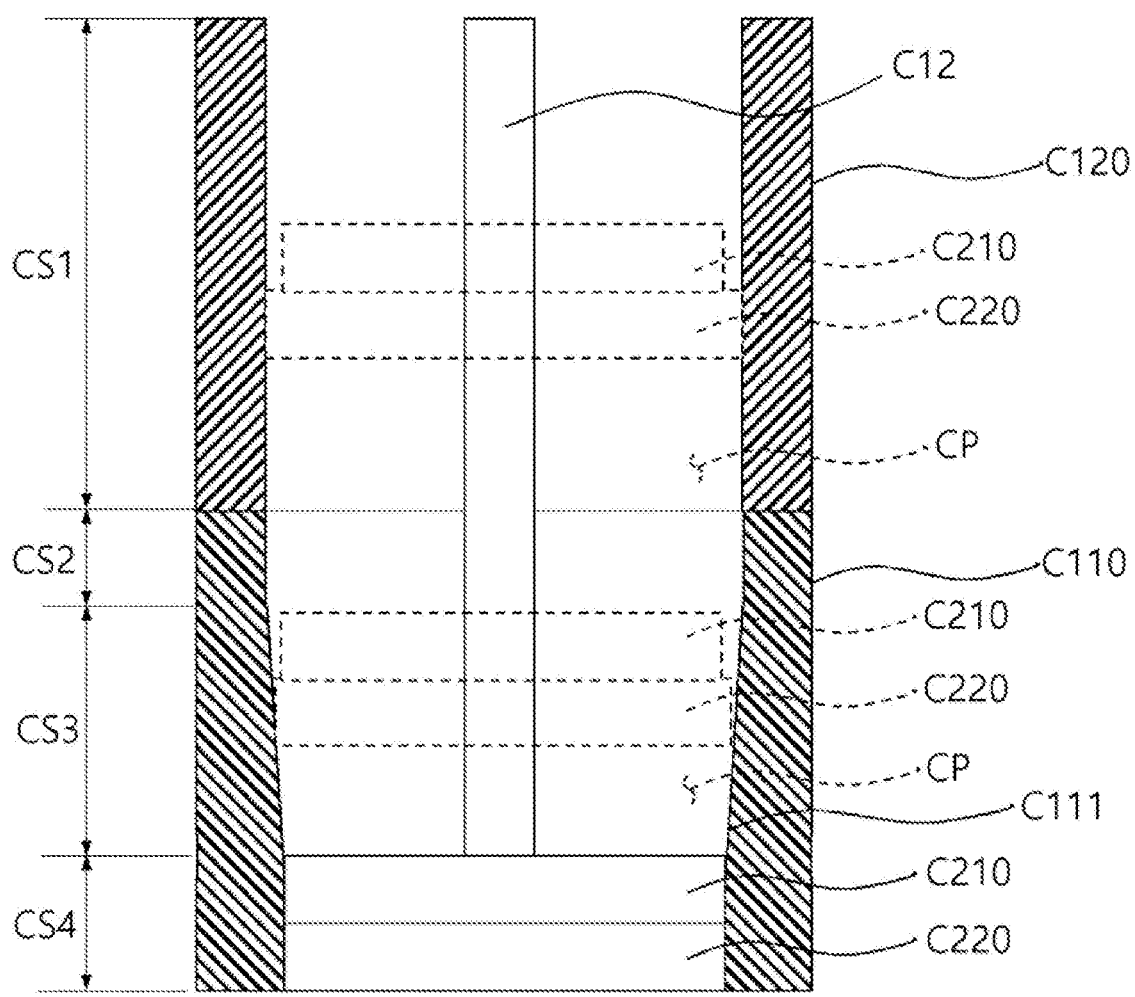
FIG. 17 is a diagram showing a step in which a fixed plate and a variable plate are lowered by section in a cylinder according to an embodiment of a second aspect of the present invention.

FIG. 17 is a diagram illustrating an operation in which the fixed plate C210 and the variable plate C220 descend by section in the cylinder C100 according to an embodiment of the second aspect of the present invention.

Referring to FIG. 17, the cylinder C100 includes an expansion section CS1, an entry section CS2, a variable section CS3, and a reduction section CS4. Here, the expansion section CS1 is a section formed in the second case C120, and is a section in which the pressurization of the piston C200 is performed while the variable plate C220 is expanded. The entry section CS2 is a section formed in the first case C110, and may be provided in a portion in which the first case C110 and the second case C120 are in contact with each other. The variable section CS3 is a section in which the variable plate C220 is reduced and is formed to become narrower in the pressing direction. The reduction section CS4 refers to a state in which the variable plate C220 is reduced, and may be a section in which the variable plate C220 and dry ice are in contact to mold the dry ice.

In detail, the piston C200 in the expansion section CS1 may be moved in the pressing direction after liquid carbon dioxide is supplied into the cylinder C100. In the expansion section CS1, because a relatively low pressure is generated during the pressurization operation, the elastic body C300 included in the piston C200 may not be contracted or the degree of contraction may be insignificant. The elastic force of the elastic body C300 may be formed to correspond to the pressure to be generated inside the cylinder C100, for example, the elastic force may be determined such that a pressure space is reduced by a tapered portion C111 of the variable section CS3 rather than being reduced by the pressure. Accordingly, the piston C200 may be moved, by the elastic force in the expansion section CS1, in the pressing direction in a state in which the vertically variable portion C221 and the pressurized support surface C211 are spaced apart from each other.

In addition, when the piston C200 enters the entry section CS2 through the expansion section CS1, the pressure is increased to a relatively high pressure. This is a design considering that it is difficult to maintain airtightness through a contact portion between the first case C110 and the second case C120, and it is determined that the time point exceeding a predetermined pressure is formed from the entry section CS2. The predetermined pressure may be determined between a maximum pressure generated in the cylinder C100 and a pressure that is ⅓ of the maximum pressure. That is, the entry section CS2 may be a section in which the predetermined pressure is formed.

In addition, the variable section CS3 is a section in which the variable plate C220 is reduced. The reduction of the variable plate C220 is not variable due to an increase in pressure in the cylinder C100, but is varied by being pressurized from a side surface thereof while the piston C200 is moved in the pressing direction as the inner wall of the first case C110 is narrowed. That is, the variable plate C220, which is in contact with an inner surface of the cylinder C100 by the piston C200 moving in the pressing direction, may be pressed from the side surface thereof by the tapered portion C111, and a pressurization force generated here may pressurize the first interlocking portion C225 and the second interlocking portion C226 from the side of the vertically variable portion C221.

Because the laterally variable portion C222 including the first interlocking portion C225 and the second interlocking portion C226 is in contact with the vertically variable portion C221 in an inclined surface, the laterally variable portion C222 in which the first interlocking portion C225 and the second interlocking portion C226 are alternately arranged in a circumferential direction of the vertically variable portion C221 may move the vertically variable portion C221 in the opposite direction of the pressing direction. Here, a force moving in the opposite direction of the pressing direction is greater than an elastic restoring force of the elastic body C300, so that the vertically variable portion C221 may be brought into close contact with the pressurized support surface C211. As a result, the vertically variable portion C221 may be in contact with the pressurized support surface C211 and the laterally variable portion C222 may be reduced to reduce a pressurized surface of the variable plate C220 in the pressing direction.

Then, at a time point of passing the variable section CS3, the variable plate C220 is reduced, and the reduced variable plate C220 may be pressurized while moving toward the remaining pressurization section in the reduction section CS4. In this case, because dry ice is being manufactured, the variable plate C220 may be in contact with the dry ice, and the dry ice may be molded. When the pressurization is completed and the dry ice is generated, the dry ice manufacturing apparatus may return to the origin. The first case C110 may be lowered to a point lower than the height of the dry ice so that the dry ice may be discharged.

A piston D200 having a curved pressurization surface, which is an embodiment of a third aspect of the present invention to be described below, is formed to have a convex curved pressurization surface, so that uniform distribution of snow D10 may be made when pressing, and the uniform distribution of the snow D10 may be manufactured as a dry ice nugget D11 having a uniform density during a compression molding operation by the piston D200. That is, the shape of the curved pressurization surface induces a uniform distribution of the snow D10, so that the dry ice nugget D11 has an overall uniform density during pressing.

Figure 18A:
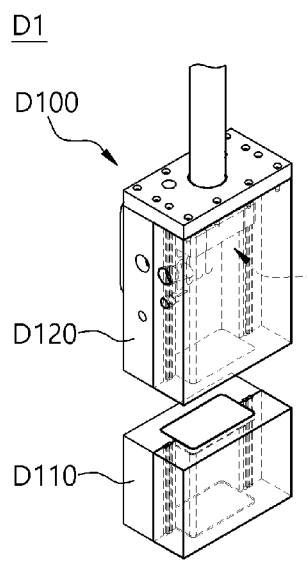
Figure 18B:
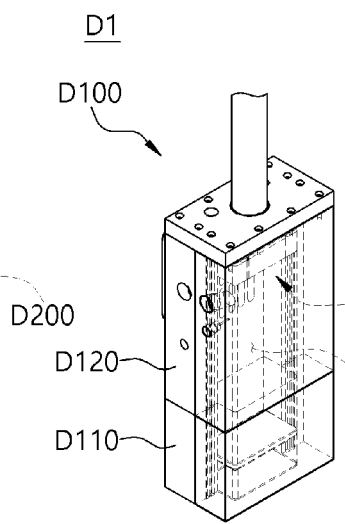
Figure 18C:
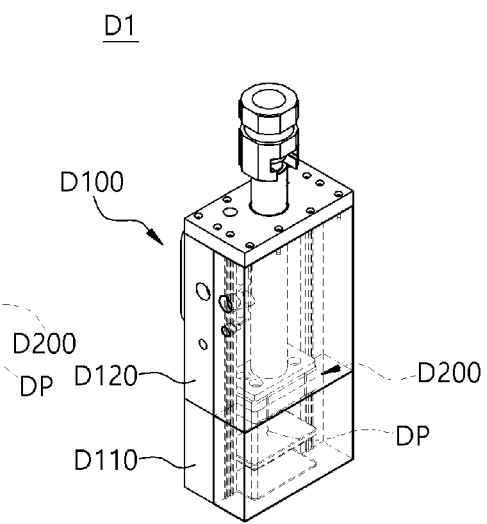

FIGS. 18A to 18C illustrate a manufacturing apparatus of the dry ice nugget D11 according to an embodiment of the third aspect of the present invention, wherein FIG. 18A illustrates a case where a first case D110 and a second case D120 are positioned at the origin while being apart from each other, FIG. 18B illustrates a case where a cylinder D100 is formed by contact between the first case D110 and the second case D120 due to the rising of the first case D110, and FIG. 18C illustrates a case where the piston D200 moves in the pressing direction in the cylinder D100.

Referring to FIGS. 18A to 18C, the manufacturing apparatus of the dry ice nugget D11 according to an embodiment of the present invention includes the cylinder D100 and the piston D200. In detail, the cylinder D100 includes the first case D110 and the second case D120. The first case D110 and the second case D120 may be spaced apart from each other while being positioned at the origin. The first case D110 and the second case D120 may come into contact with each other by moving at least one of the first case D110 and the second case D120, and an internal space of the cylinder D100 may be formed in a state in which the first case D110 and the second case D120 contact each other. The internal space may be the pressurization space DP. The pressurization space DP may be pressurized by the movement of the piston D200 positioned on the second case D120 side, and the pressure of the pressurization space DP may be increased. That is, when the pressurization space DP is formed inside the cylinder D100, as the piston D200 moves to the pressurization space DP, the volume in the pressurization space DP decreases, and the reduced volume of the pressurization space DP relatively increases the pressure of the pressurization space DP.

Here, the increased pressure may be determined in a range of 16 bar to 20 bar. Dry ice may be formed within the above pressure range. The formation of dry ice may be performed by pressurizing, by the piston D200, the pressurization space DP in a state in which liquid carbon dioxide or the snow D10 is injected. The injection of the liquid carbon dioxide or the snow D10 may be performed through a supply hole formed in one side of the second case D120.

Here, in the case of liquid carbon dioxide, it is accommodated relatively uniformly while forming a horizontal plane, but in the case of the snow D10, it is difficult to accumulate relatively evenly, such as forming a horizontal plane, due to being made of solid particles, and a relatively large amount of accumulation may occur in some portions. When a portion with a large accumulation amount is pressed in the pressing direction by a flat pressing surface, a portion with a relatively small accumulation amount has a higher density than that of a compressed portion, and a portion with a small accumulation amount has a lower density. The non-uniform density according to the accumulated amount is a factor of lowering the sustained speed of the manufactured dry ice.

To overcome this point, in the case of the piston D200 to be described below, the pressing surface thereof is made in a curved surface, when the piston D200 is in contact with the snow D10, the snow D10, which is uniformly accumulated, is relatively even and compressed at the same time.

Figure 19:
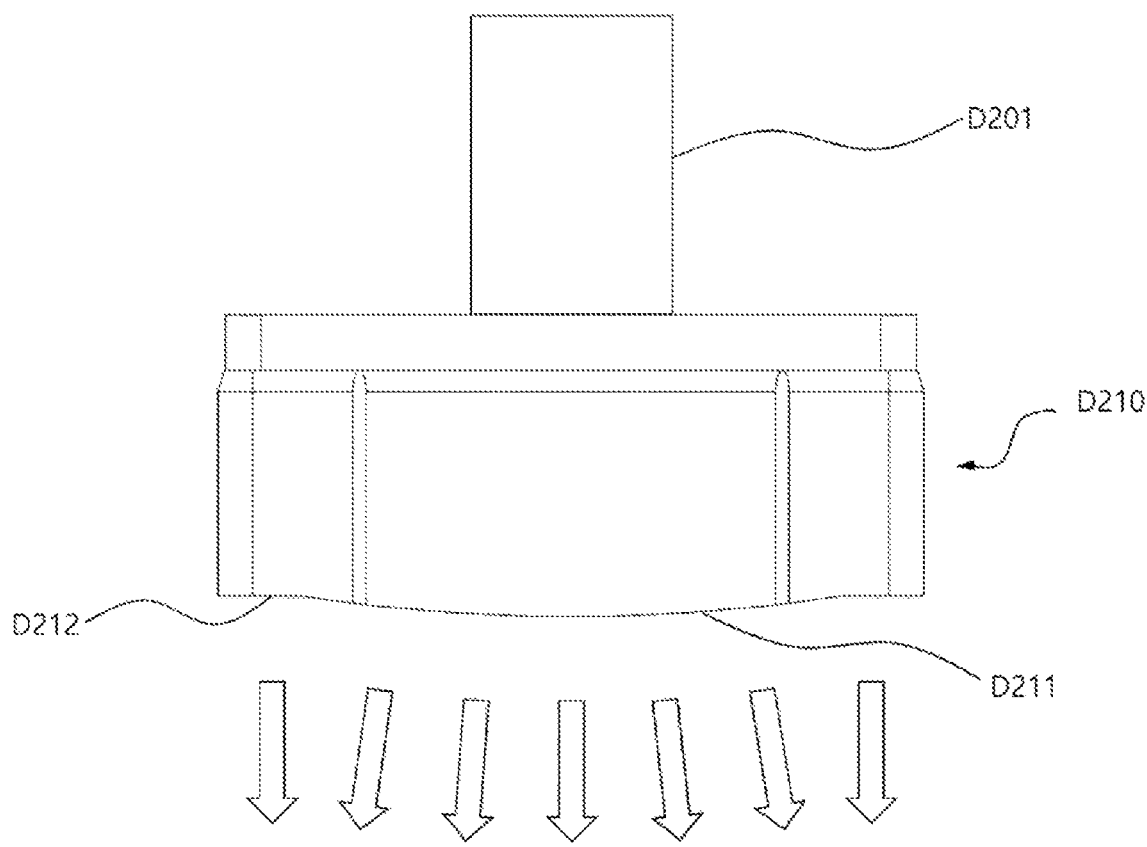
FIG. 19 is a diagram of a piston according to an embodiment of a third aspect of the present invention.

FIG. 19 is a diagram of the piston D200 according to an embodiment of the third aspect of the present invention.

Referring to FIG. 19, the piston D200 includes a rod D201 and a pressurization plate D210 coupled to one end of the rod D201. The pressurization plate D210 includes a dispersion pressurization portion D211 and a pressing end portion D212 on the pressing surface. The dispersion pressurization portion D211 may have a curved surface, and may be convex in the pressing direction. The example is a form in which a curved surface is formed in a transverse direction with respect to the pressing direction, but the curved portion of the pressing surface is not limited thereto, and a shape is not limited as long as it is a type in which a convex curved portion is formed in the pressing direction, such as a hemispherical convex shape. Of course, it may be preferably a curved flat-type pressing surface as shown.

This shape has a high probability that the point most advanced in the pressing direction due to the convex shape will first touch the snow D10 during pressing, and the snow D10 may be dispersed by being pushed to a peripheral portion D11d by the dispersion pressurization portion D211 of the curved surface. In the dispersion and pressing direction, the dispersion amount may be increased as the curvature of the dispersion pressurization portion D211 increases. This pushes the snow D10 in a direction in which a dispersion direction of the snow D10 is perpendicular to the curved surface, thereby dispersing the snow D10 to both sides from the most protruding point of the dispersion pressurization portion D211. This is a description according to the illustrated example, and when the dispersion pressurization portion D211 is convexly provided in a hemispherical shape including a curved portion, the snow D10 may be radially dispersed from the most protruding point in the dispersion direction.

That is, even when there is a change in shape on the premise that the dispersion pressurization portion D211 as a structure for dispersing the snow D10 includes a curved portion, the most protruding point is preferably located at the center of the pressing surface, and the snow D10 may be dispersed from a center to the peripheral portion D11d of the center, such as on both sides or radially.

When the dispersion of the snow D10 is made through the above-described operation in which the snow D10 is dispersed, the pressure in the continuous pressing direction of the piston D200 may pressurize the dispersed snow D10. This is compression by contact, and the snow D10 may be molded while increasing the density.

That is, the dispersion pressurization portion D211 having a curved shape among pressing portions of the piston D200 may manufacture the dry ice nugget D11 having a uniform density by performing operations from the dispersion of the snow D10 to the pressing.

Figure 20:
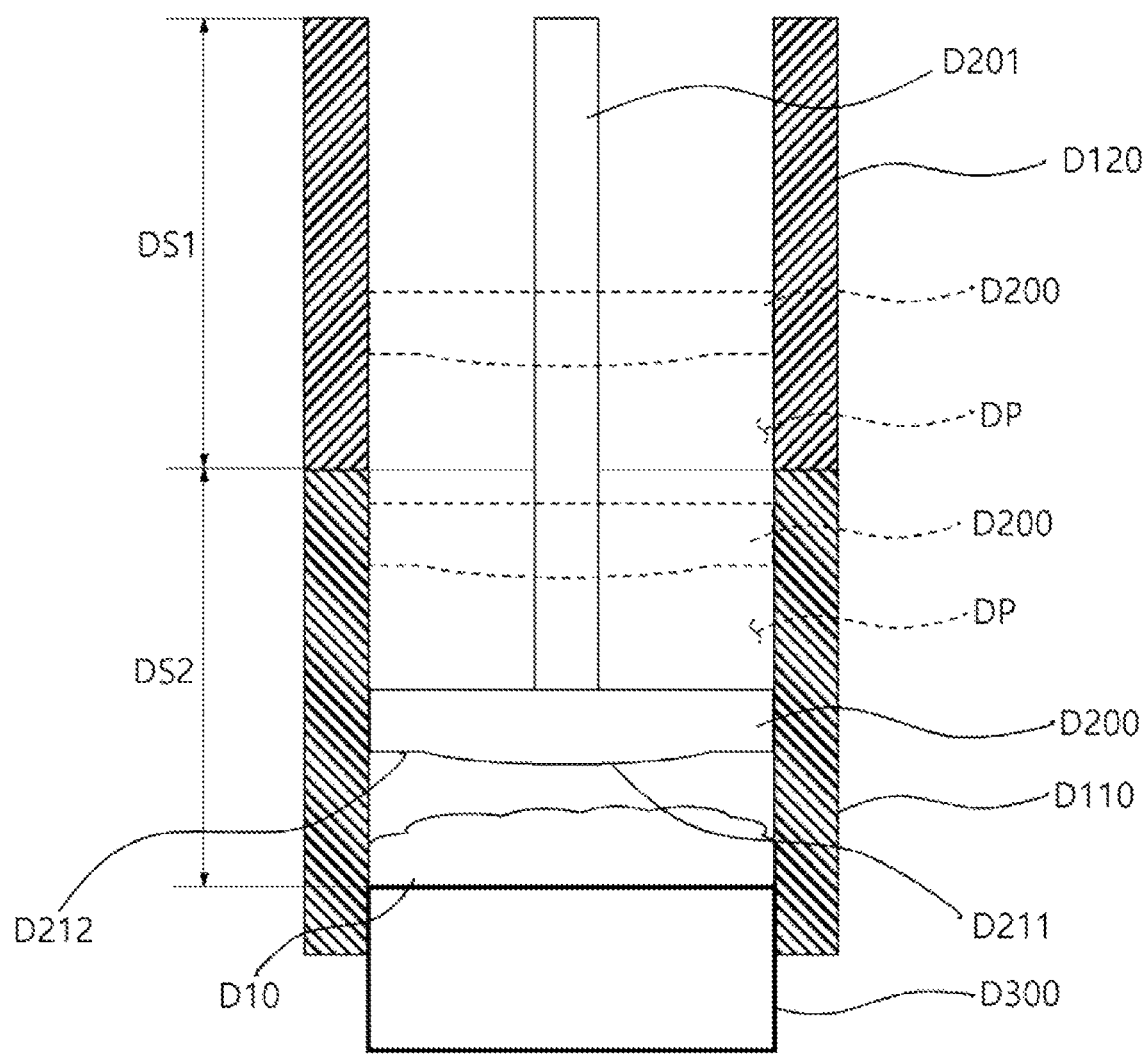
FIG. 20 shows that a piston according to an embodiment of a third aspect of the present invention moves in a pressing direction.

FIG. 20 is a diagram illustrating a case where the piston D200 according to an embodiment of the third aspect of the present invention moves in the pressing direction.

Referring to FIG. 20, the piston D200 may be moved to a second pressurization section DS2 by passing through a first pressurization section DS1. Because the snow D10 is supplied before the movement of the piston D200, the snow D10 may receive a pressure increased according to the movement of the piston D200. The piston D200 may pressurize the snow D10 through the second pressurization section DS2 formed inside the first case D110 via the first pressurization section DS1 formed inside the first case D110.

Meanwhile, because a separate operation such as leveling is not performed after the snow D10 is provided in the cylinder D100, an accumulated amount of the provided snow D10 may be different for each portion on a support D300. When the snow D10 having a different accumulation amount is pressurized by the pressurization plate D210, a portion with a large accumulation amount has a high density, and a portion with a small accumulation amount has a low density, wherein the portion having a low density may be non-uniformly vaporized due to a relatively high vaporization rate, which may be a cause of accelerating the vaporization rate of the dry ice nugget D11 as a whole.

To prevent this, the dispersion pressurization portion D211 having a curved surface capable of dispersing the snow D10 is provided, and when the dispersion pressurization portion D211 increases pressure and is in contact with the snow D10, the uneven accumulation state of the snow D10 may be dispersed, and thus the snow D10 may be dispersed in a form corresponding to a molding shape. This is a kind of pre-treatment capable of manufacturing the dry ice nugget D11 having a uniform density through compression molding of the snow D10 by contact with the dispersion pressurization portion D211. This is performed by the dispersion pressurization portion D211 of the pressurization plate D210.

Further, when the pressing end portion D212 is positioned at at least both ends from the dispersion pressurization portion D211 and the dispersion pressurization portion D211 protrudes in a hemispherical shape, the pressing end portion D212 may be formed in a ring shape. That is, the shape is not limited to a particular shape as long as the above conditions are satisfied.

The pressing end portion D212 may be formed with a flat surface and in a direction parallel to the pressing direction so that the snow D10 dispersed laterally by the dispersion pressurization portion D211 may be more effectively aggregated. This is because pressurization is made on the pressing end portion D212 side before the snow D10 moved to the side surface by the dispersion pressurization portion D211 is moved to an area where the pressing surface is pressed, and thus the snow D10 being moved may not enter a moving direction of the pressing end portion D212 having a relatively high density. That is, the snow D10 is pressed by the dispersion pressurization portion D211, and the snow D10 located on the front side in the pressing direction of the dispersion pressurization portion D211 may be compressed within the range of the front side after contact with the dispersion pressurization portion D211.

Figure 21:
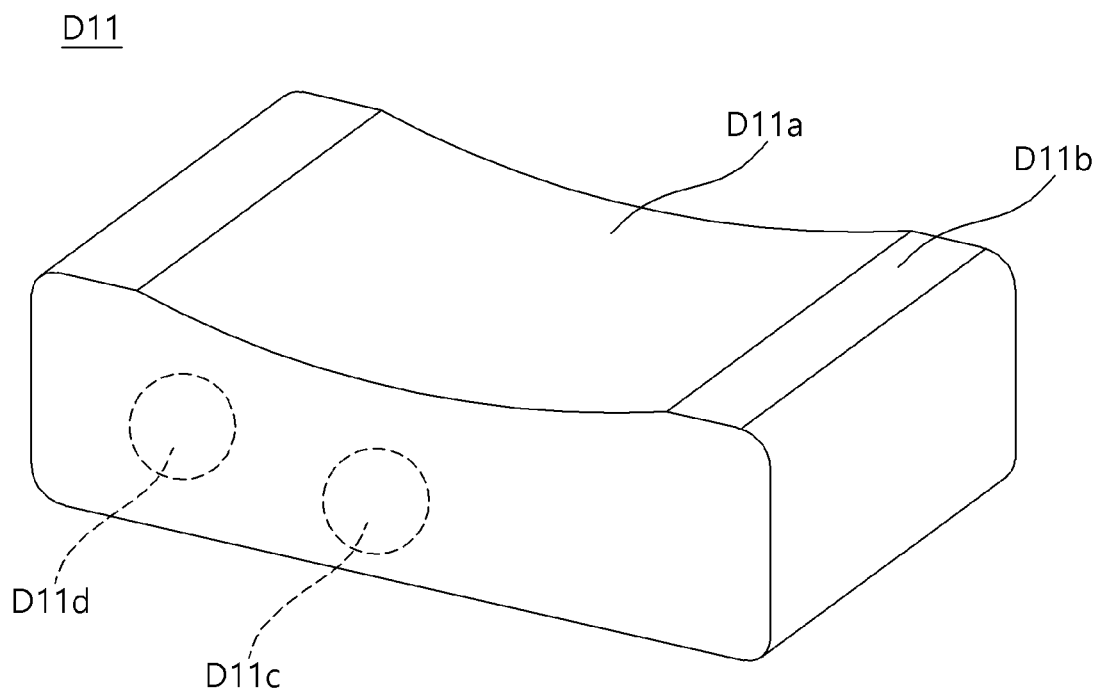
FIG. 21 is a diagram of a dry ice nugget produced by a dry ice nugget manufacturing apparatus according to an embodiment of a third aspect of the present invention.

FIG. 21 is a diagram of the dry ice nugget D11 generated by the manufacturing apparatus of the dry ice nugget D11 according to an embodiment of the third aspect of the present invention.

FIG. 21 is an example of the dry ice nugget D11 manufactured by the above-described manufacturing apparatus of the dry ice nugget D11, and is the dry ice nugget D11 including a curved-surface portion compressed by the dispersion pressurization portion D211 and a flat-surface portion formed by the pressing end portion D212. Preferably, in the dry ice nugget D11, the densities of a central portion D11c and the peripheral portion D11d are preferably equal to each other and may be equal to each other when comparing arbitrary portions per unit volume with each other. At least this may achieve an improved result in uniformity over the density difference between any portions in the non-uniform dry ice nugget D11. As a result, the vaporization rate of the dry ice nugget D11 may be delayed, and the dry ice nugget D11 that may be used for a longer period of time than that of the dry ice nugget D11 having a flat surface that may be manufactured with the same amount of the snow D10 may be manufactured.

According to an embodiment of the present invention, a dry ice nugget manufactured by directly phase-changing liquid carbon dioxide into solid dry ice can be provided.

According to an embodiment of the present invention, a method of directly phase-changing liquid carbon dioxide into solid dry ice can be provided.

Although representative embodiments of the present invention have been described in detail above, those of ordinary skill in the art to which the present invention pertains will understand that various modifications are possible without departing from the scope of the present invention with respect to the above-described embodiments. Therefore, the scope of the present invention should not be limited to the described embodiments, and should be defined by the claims described below as well as the claims and equivalents.

DESCRIPTION OF REFERENCE NUMERALS

A1: Extrusion head
A2: Extrusion pellet
A2a: Pellet
A3, A6: Piston
A4, A7: Cylinder
A5: Supply portion
A10, A100: Nugget
A11: Compressed pellet
A12: Void
A100a: Snow
AM: Moving direction
AS: Injection direction
AP: Pressing direction
AV1, AF1: First sublimation section
AV2, AF2: Second sublimation section
AS10: Injection operation
AS20: Solidification operation
AS30: Pressurization operation
AS40: Molding operation
B1a: Pressurization member
B1: Cylinder
B2: Molding plate
B3: Support end
B10, B10a: Dry ice manufacturing apparatus
B100: Support base
B110: Molding portion
B150: Contact portion
B200: First case
B210: Groove
B220: Sealing portion
B300: Second case
B301: Supply hole
B320: Protruding portion
B400: Pressurization piston
BD: Pressing direction
BA: First airtight maintenance structure
BB: Second airtight maintenance structure
BP: Compression space
BH: Raising height
BS10: First case moving operation
BS20: Compression space formation operation
BS30: Liquid-carbon dioxide injection operation
BS40: Pressurization operation
BS50: Return operation
BS60: Discharge operation
C10: Connection pin
C11: Clearance space
C12: Rod
C100: Cylinder
C110: First case
C111: Tapered portion
C120: Second case
C200: Piston
C210: Fixed plate C211: Pressurized support surface
C220: Variable plate
C221: Vertically variable portion
C222: Laterally variable portion
C225: First interlocking portion
C226: Second interlocking portion
C300: Elastic body
CS1: Expansion section
CS2: Entry section
CS3: Variable section
CS4: Reduction section
CP: Pressurization space
D10: Snow
D11: Dry ice nugget
D11a: Curved-surface portion
D11b: Flat-surface portion
D11c: Central portion
D11d: Peripheral portion
D100: Cylinder
D110: First case
D120: Second case
D200: Piston
D201: Rod
D210: Pressurization plate
D211: Dispersion pressurization portion
D212: Pressing end portion
D300: Support
DS1: First pressurization section
DS2: Second pressurization section
DP: Pressurization space

What is claimed is:

1. A dry ice nugget manufacturing apparatus for manufacturing dry ice by injecting liquid carbon dioxide and pressurizing a phase-changed liquid carbon dioxide in a snow state,
wherein the dry ice nugget manufacturing apparatus comprises:
a support base fixed to a ground surface, extending upward, and comprising a support plate facing upward at an upper end portion;
a first case capable of reciprocating along an extension surface of the support base in a direction in which the support base is extended;
a second case which contacts the first case when the first case moves upward to form a compression space in which airtightness is maintained and in which a supply hole connected to a supply line is formed to provide liquid carbon dioxide to the compression space; and
a pressurization piston configured to penetrate the second case and reciprocate in the compression space,
wherein the pressurization piston is lowered so that the compression space is determined within a pressure range of 16 bar to 20 bar, and
wherein the first case comprises a groove formed in a surface in contact with the second case, and a sealing portion located in the groove, and
wherein the second case comprises a protruding portion, which is made of a metal material, in a form corresponding to the sealing portion on the surface in contact with the first case.

2. A dry ice nugget manufactured via the dry ice nugget manufacturing apparatus of claim 1.

3. A method of manufacturing a dry ice nugget via the dry ice nugget manufacturing apparatus of claim 1.

4. The dry ice nugget manufacturing apparatus of claim 1, wherein, in the compression space, the pressurization piston approaches the support plate and the liquid carbon dioxide is pressurized.

5. The dry ice nugget manufacturing apparatus of claim 1, wherein the second case and the support base are fixed, and are driven by reciprocating motions of the first case and the pressurization piston.

6. The dry ice nugget manufacturing apparatus of claim 1, wherein, in the compression space, the pressurization piston approaches the support plate and the liquid carbon dioxide is pressurized.

7. The dry ice nugget manufacturing apparatus of claim 6, wherein the second case and the support base are fixed, and are driven by reciprocating motions of the first case and the pressurization piston.

8. The method of claim 3, comprising:
moving a first case upward in an extension direction of a support base fixed to and supported by a ground surface to be in contact with a second case;
forming a compression space where an airtight state is maintained in a space where the first case and the second case communicate with each other by the movement of the first case;
injecting liquid carbon dioxide into the compression space formed in the forming of the compression space;
moving a pressurization piston connected to the second case in a pressing direction which is a direction of the support base and pressurizing the liquid carbon dioxide injected in the injecting of the liquid carbon dioxide;
returning the pressurization piston and the first case after the pressurizing; and
discharging dry ice phase-changed from the liquid carbon dioxide pressurized after the returning,
wherein the pressurization piston approaches a support plate in the compression space, the liquid carbon dioxide is pressurized, and the pressurization piston is lowered so that the compression space is determined within a pressure range of 16 bar to 20 bar.

9. The method of claim 8, wherein, when a pressurization force of the pressurization piston acts in the direction of the support base, the pressurization force is supported by a reaction of the support base fixed to the ground surface.

10. A dry ice nugget manufacturing apparatus for manufacturing dry ice by injecting liquid carbon dioxide and pressurizing a phase-changed liquid carbon dioxide in a snow state,
wherein the dry ice nugget manufacturing apparatus comprises:
a cylinder comprising a first case and a second case and in which a pressurization space is formed by contact between the first case and the second case; and
a piston moving from the second case to the first case in the cylinder and pressurizing the pressurization space,
wherein the piston comprises:
a fixed plate having a pressurized support surface facing a pressing direction in the cylinder;
a variable plate connected to the fixed plate by a connection pin and comprising a vertically variable portion movable in the pressing direction and a laterally variable portion located around the vertically variable portion and expandable by moving laterally with respect to the pressing direction; and
an elastic body located between the fixed plate and the variable plate and elastically deformed in the pressing direction, the laterally variable portion comprises a first interlocking portion and a second interlocking portion, which are in contact with an inner wall of the cylinder, and is moved in the pressing direction to reduce a width of the inner wall of the cylinder such that a pressing area is reduced and the first interlocking portion and the second interlocking portion pressurize the vertically variable portion, and the vertically variable portion is elastically moved toward the pressurized support surface when being pressurized by the laterally variable portion.

11. The dry ice nugget manufacturing apparatus of claim 10, wherein the connection pin has one end fixedly connected to the fixed plate and the other end connected to the vertically variable portion, wherein the vertically variable portion and the connection pin are connected by forming a clearance space by a predetermined distance in the pressing direction.

12. The dry ice nugget manufacturing apparatus of claim 10, wherein the first interlocking portion comprises inclined planes spaced apart at an angle within a 45-degree range from the pressing direction respectively corresponding to at least three or more surfaces of the vertically variable portion facing outside on a flat surface in the pressing direction, and
the second interlocking portion is located around the vertically variable portion with respect to the vertically variable portion and alternately arranged in contact with the first interlocking portion.

13. The dry ice nugget manufacturing apparatus of claim 10, wherein the first case comprises a tapered portion for reducing the laterally variable portion in a state extending laterally from an inner side of the second case while maintaining a state in contact with an inner surface of the cylinder from the second case to the first case when the piston moves in the pressing direction.

14. The dry ice nugget manufacturing apparatus of claim 10, comprising:
a rod extending from an outer side of the cylinder to an inner side thereof; and
a pressurization plate coupled to one end portion of the rod located inside the cylinder, pressurizing in a pressing direction formed from a first pressurization section formed in the cylinder to a second pressurization section, and extending to be in contact with an inner wall of the cylinder,
wherein the pressurization plate comprises:
a dispersion pressurization portion formed in a convexly curved shape toward the pressing direction; and
a pressing end portion which is in contact with the inner wall of the cylinder at an end portion of the dispersion pressurization portion and is formed with a flat surface facing the pressing direction,
wherein the dispersion pressurization portion disperses snow accumulated unevenly in the second pressurization section in a form corresponding to a molding shape, prior to pressurization through contact between the pressurization plate and the snow.

15. The dry ice nugget manufacturing apparatus of claim 14, wherein the dispersion pressurization portion is formed in a convex hemispherical shape in the pressing direction.

16. The dry ice nugget manufacturing apparatus of claim 14, wherein the pressing end portion pressurizes the snow, which is pressurized by the dispersion pressurization portion in the pressing direction and moved to a side surface, in the pressing direction.

* * * * *